United States Patent
Nicholas et al.

(10) Patent No.: US 10,093,563 B2
(45) Date of Patent: Oct. 9, 2018

(54) METHOD FOR MAKING CHELATING BASE PRODUCT USED IN WATER-BASED SYSTEMS

(71) Applicant: Earth Science Laboratories, Bentonville, AR (US)

(72) Inventors: David Nicholas, Gulf Breeze, FL (US); Reid Henry Bowman, Fort Collins, CO (US); Freddie L. Singleton, Fruit Cove, FL (US)

(73) Assignee: Earth Science Laboratories, Bentonville, AR (US)

( * ) Notice: Subject to any disclaimer, the term of this patent is extended or adjusted under 35 U.S.C. 154(b) by 27 days.

(21) Appl. No.: 15/184,531

(22) Filed: Jun. 16, 2016

(65) Prior Publication Data

US 2016/0368793 A1    Dec. 22, 2016

Related U.S. Application Data

(60) Provisional application No. 62/182,191, filed on Jun. 19, 2015.

(51) Int. Cl.
 *C02F 1/68* (2006.01)
 *C05D 9/00* (2006.01)
 (Continued)

(52) U.S. Cl.
 CPC ............... *C02F 1/683* (2013.01); *C02F 1/50* (2013.01); *C05C 3/00* (2013.01); *C05D 5/00* (2013.01);
 (Continued)

(58) Field of Classification Search
 CPC .. C02F 1/683; C05C 3/00; C05D 5/00; C05G 3/0064; C01C 1/242
 See application file for complete search history.

(56) References Cited

U.S. PATENT DOCUMENTS 2,659,659 A * 11/1953 Shmidl .................. C01C 1/242
                                                                 23/302 A
2,856,278 A * 10/1958 Bray ......................... C05C 3/00
                                                                 159/16.1

(Continued)

FOREIGN PATENT DOCUMENTS

AU      2016280823         2/2018
CN      101850989 A  *  10/2010
(Continued)

OTHER PUBLICATIONS

Machine translation of CN-101850989-A; ProQuest translation obtained on Mar. 13, 2018 ; 7 pages.*
(Continued)

*Primary Examiner* — Nicholas E Hill
(74) *Attorney, Agent, or Firm* — Kilpatrick Townsend & Stockton LLP

(57) ABSTRACT

A base product fluid is produced by adding anhydrous liquid ammonia and a first portion of sulfuric acid to water flowing in a process line to form a mixed fluid. The mixed fluid may be cooled by flowing the mixed fluid through a heat exchanger. A second portion of sulfuric acid may be added to the mixed fluid to form the base product fluid. The second portion of sulfuric acid may be greater, by weight, than the first portion of sulfuric acid. The base product fluid may include a molecular compound that is a chelating compound. The molecular compound may have the formula: $((NH_4)_2SO_4)_a \cdot (H_2SO_4)_b \cdot (H_2O)_c \cdot (NH_4HSO_4)_x$.

7 Claims, 25 Drawing Sheets

(51) Int. Cl.

| | |
|---|---|
| *C05C 3/00* | (2006.01) |
| *C05D 5/00* | (2006.01) |
| *C05D 9/02* | (2006.01) |
| *C05G 3/00* | (2006.01) |
| *C02F 1/50* | (2006.01) |
| *C02F 101/10* | (2006.01) |
| *C02F 103/42* | (2006.01) |

(52) U.S. Cl.
CPC ............... *C05D 9/00* (2013.01); *C05D 9/02* (2013.01); *C05G 3/0064* (2013.01); *C02F 1/505* (2013.01); *C02F 1/68* (2013.01); *C02F 2101/10* (2013.01); *C02F 2103/42* (2013.01); *C02F 2303/02* (2013.01); *C02F 2303/04* (2013.01)

(56) References Cited

U.S. PATENT DOCUMENTS

| | | | | |
|---|---|---|---|---|
| 2,902,342 | A | * | 9/1959 | Kerley, Jr. ............... C05B 7/00 422/618 |
| 3,408,157 | A | | 10/1968 | Miller et al. |
| 3,954,942 | A | * | 5/1976 | Achorn .................. C05B 7/00 423/313 |
| 4,400,374 | A | | 8/1983 | Cardarelli |
| 4,564,504 | A | * | 1/1986 | Sorber .................. B01J 19/0013 165/82 |
| 4,734,200 | A | | 3/1988 | Berry |
| 4,762,546 | A | | 8/1988 | Boles |
| 5,989,595 | A | | 11/1999 | Cummins |
| 6,190,636 | B1 | | 2/2001 | Khan et al. |
| 6,242,011 | B1 | | 6/2001 | Cummins |
| 6,565,893 | B1 | | 5/2003 | Jones et al. |
| 7,192,618 | B2 | | 3/2007 | Cummins et al. |
| RE41,109 | E | | 2/2010 | Cummins |
| 7,824,524 | B2 | | 11/2010 | Sakovich et al. |
| 8,012,511 | B1 | | 9/2011 | Cummins et al. |
| 8,912,122 | B1 | * | 12/2014 | Blackstone .............. C05G 3/06 504/100 |
| 8,974,763 | B1 | * | 3/2015 | Jain .......................... C05C 3/005 422/129 |
| 9,938,171 | B2 | | 4/2018 | Nicholas et al. |
| 2002/0192132 | A1 | | 12/2002 | Carlson, Jr. et al. |
| 2005/0005660 | A1 | | 1/2005 | Burnham et al. |
| 2005/0124797 | A1 | | 6/2005 | Kelly et al. |
| 2005/0191365 | A1 | | 9/2005 | Creasey et al. |
| 2005/0211631 | A1 | | 9/2005 | Muller et al. |
| 2005/0215796 | A1 | | 9/2005 | Ueno et al. |
| 2006/0276339 | A1 | | 12/2006 | Windsor et al. |
| 2009/0148335 | A1 | | 6/2009 | Adair et al. |
| 2016/0366877 | A1 | | 12/2016 | Nicholas et al. |
| 2016/0368792 | A1 | * | 12/2016 | Nicholas .................. C05D 9/00 |
| 2016/0368794 | A1 | * | 12/2016 | Nicholas .................. C05D 9/00 |
| 2017/0225979 | A1 | * | 8/2017 | Nicholas .................. C02F 1/683 |

FOREIGN PATENT DOCUMENTS

| | | | |
|---|---|---|---|
| CN | 102491297 A | * | 6/2012 |
| WO | 2016205496 | | 12/2016 |

OTHER PUBLICATIONS

Machine translation of CN-102491297-A; EspaceNet translation obtained on Mar. 13, 2018; 5 pages.*
Max Appl, Ammonia, 1. Introduction, Ullmann's Encyclopedia of Industrial Chemistry, vol. 3, pp. 107-137, published online 2011.*
U.S. Appl. No. 15/184,523, "Corrected Notice of Allowability", dated Jan. 12, 2018, 11 pages.
U.S. Appl. No. 15/184,523, "Notice of Allowance", dated Dec. 4, 2017, 13 pages.
U.S. Appl. No. 15/184,549, "Non-Final Office Action", dated Jan. 4, 2018, 5 pages.
U.S. Appl. 15/388,767, "Non-Final Office Action", dated Dec. 11, 2017, 10 pages.
"Aqua Sierra, Inc's Copper Ion Injection Systems As a Control for Biological Fouling", article, 2013, 3 pages, Morrison, CO, United States.
Watters, "Effectiveness of EarthTec on killing invasive quagga mussels (*Dreissena rostriformis bugenis*) and preventing their colonization in the Western U.S.", May 1, 2011, 85 pages, University of Nevada, Las Vegas.
Cottrell, "Zebra Mussel Adhesion and Aspects of its Prevention Using Copper", Thesis, Department of Chemical Engineering and Applied Chemistry, University of Toronto, 2000, 231 pages, Canada.
International Search Report and Written Opinion, Application No. PCT/US2016/037849, dated Sep. 7, 2016, 8 pages.
U.S. Appl. No. 15/184,523, Corrected Notice of Allowability dated Mar. 12, 2018, 2 pages.
U.S. Appl. No. 15/184,537, Non-Final Office Action dated Mar. 2, 2018, 9 pages.
Clegg et al., A Generalised Multicomponent Thermodynamic Model Applied to the (NH4)2SO4—H2SO4—H2O System to High Supersaturation and Low Relative Humidity at 298.15 K, Journal of Aerosol Science, vol. 26, Issue 1, Jan. 1995, pp. 19-38.
DePalma et al., Structure and Energetics of Nanometer Size Clusters of Sulfuric Acid with Ammonia and Dimethylamine, The Journal of Physical Chemistry A, vol. 116, No. 3, Jan. 26, 2012, pp. 1030-1040.
International Application No. PCT/US2016/037849, International Preliminary Report on Patentability dated Dec. 19, 2017, 5 pages.
International Application No. PCT/US2017/067321, International Search Report and Written Opinion dated Mar. 12, 2018, 8 pages.
U.S. Appl. No. 15/184,537, "Notice of Allowance", dated Jun. 1, 2018, 8 pages.
U.S. Appl. No. 15/388,767, "Notice of Allowance", dated May 4, 2018, 10 pages.
U.S. Appl. No. 15/184,549, "Final Office Action", dated Aug. 9, 2018, 8 pages.
U.S. Appl. No. 15/908,844, "Non-Final Office Action", dated Jul. 20, 2018, 10 pages.

* cited by examiner

METHOD FOR MAKING CHELATING BASE PRODUCT USED IN WATER-BASED SYSTEMS

PRIORITY CLAIM

This patent claims priority to U.S. Provisional Patent Application No. 62/182,191 to Nicholas et al., entitled "BASE PRODUCT FOR USE IN WATER-BASED SYSTEM TREATMENTS", filed Jun. 19, 2015, which is incorporated by reference in its entirety as if fully set forth herein.

BACKGROUND

1. Field of the Invention

The present invention relates to a base product used for various water-based treatment systems. More particularly, the invention relates to methods for making a base product fluid with a chelating compound having a selected formula.

2. Description of Related Art

Base products such as chelating agents have been blended with copper sulfate for various uses in water-based treatment systems. U.S. Pat. No. 4,564,504 to Sorber, which is incorporated by reference as if fully set forth herein, discloses an early process (the "Sorber process") that used water, ammonia, and sulfuric acid to produce a novel acid. The Sorber process involved a vat mixing batch process where sulfuric acid is slowly mixed to an aqueous ammonium solution. The Sorber process was performed in open vats and was dangerous due to the extremely exothermic nature of the reactions involved. The Sorber process may be termed a "cold process" as the mixing was slowed down to avoid excess heat generation and/or explosions from occurring.

There have been several attempts to improve upon the "cold process" (Sorber process). Examples of these attempts are found in U.S. Pat. No. 5,989,595 to Cummins, U.S. Pat. No. 6,242,011 to Cummins, U.S. Pat. No. RE41,109 to Cummins, and U.S. Pat. No. 8,012,511 to Cummins, each of which is incorporated by reference as if fully set forth herein. In addition, a vat mixing process involving the use of high pressure and high voltage DC current was attempted.

SUMMARY

In certain embodiments, a chelating compound has the formula: $((NH_4)_2SO4)_a \cdot (H_2SO_4)_b \cdot (H_2O)_c \cdot (NH_4HSO_4)_x$; where a is between 1 and 5, b is between 1 and 5, c is between 1 and 5, and x is between 1 and 10. In certain embodiments, a chelating compound has the formula: $((NH_4)_2SO4)_a \cdot (H_2SO_4)_b \cdot (H_2O)_c \cdot (NH_4HSO_4)_x$; where a is at least 1, b is at least 1, c is at least 1, and x is between 1 and 10. In some embodiments, the molecular compound includes an elemental composition of: between about 3% and about 6% hydrogen; between about 10% and about 15% nitrogen; between about 25% and about 30% sulfur; and between about 52% and about 60% oxygen. In some embodiments, the chelating compound has a pH below about 2 when mixed with water. In certain embodiments, a chelating fluid includes a plurality of chelating compounds in a water solution, the chelating compounds having the formula: $((NH_4)_2SO_4)_a \cdot (H_2SO_4)_b \cdot (H_2O)_c \cdot (NH_4HSO_4)_x$; where a varies between 1 and 5 in the plurality of chelating compounds, b varies between 1 and 5 in the plurality of chelating compounds, c varies between 1 and 5 in the plurality of chelating compounds, and x varies between 1 and 10 in the plurality of chelating compounds.

In certain embodiments, a method for producing a base product fluid includes: flowing water through a process line; adding and mixing anhydrous liquid ammonia and a first portion of sulfuric acid to water in a process line to form a mixed fluid; cooling the mixed fluid by flowing the mixed fluid through a heat exchanger; and adding a second portion of sulfuric acid to the mixed fluid to form the base product fluid, wherein the second portion of sulfuric acid is greater, by weight, than the first portion of sulfuric acid. In certain embodiments, a chelating compound is formed by the method of: adding and mixing anhydrous liquid ammonia and a first portion of sulfuric acid to flowing water in a process line to form a mixed fluid; cooling the mixed fluid by flowing the mixed fluid through a heat exchanger; and adding a second portion of sulfuric acid to the mixed fluid to form a product fluid comprising the molecular compound, wherein the second portion of sulfuric acid is greater than the first portion of sulfuric acid.

In certain embodiments, a water treatment solution includes a chelating compound having the formula: $((NH_4)_2SO_4)_a \cdot (H_2SO_4)_b \cdot (H_2)_c \cdot (NH_4HSO_4)_x$, where a is between 1 and 5, b is between 1 and 5, c is between 1 and 5, and x is between 1 and 10; a metal salt; and water. In certain embodiments, a method for making a water treatment solution includes: adding a metal salt to a base product fluid and water, wherein the base product fluid comprises: a chelating compound having the formula: $((NH_4)_2SO_4)_a \cdot (H_2SO_4)_b \cdot (H_2O)_c \cdot (NH_4HSO_4)_x$, wherein a is between 1 and 5, b is between 1 and 5, c is between 1 and 5, and x is between 1 and 10. In certain embodiments, a method of treating water includes: adding a water treatment solution to water in need of treatment, the water treatment solution comprising a metal salt and a chelating compound having the formula: $((NH_4)_2SO_4)_a \cdot (H_2SO_4)_b \cdot (H_2O)_c \cdot (NH_4HSO_4)_x$, wherein a is between 1 and 5, b is between 1 and 5, c is between 1 and 5, and x is between 1 and 10.

In certain embodiments, an agriculture treatment solution includes a chelating compound having the formula: $((NH_4)_2SO_4)_a \cdot (H_2SO_4)_b \cdot (H_2O)_c \cdot (NH_4HSO_4)_x$, where a is between 1 and 5, b is between 1 and 5, c is between 1 and 5, and x is between 1 and 10; one or more metal salts; and water. In certain embodiments, a method for making an agriculture treatment solution includes: adding one or more metal salts to a base product fluid and water, wherein the base product fluid comprises: a chelating compound having the formula: $((NH_4)_2SO_4)_a \cdot (H_2SO_4)_b \cdot (H_2O)_c \cdot (NH_4HSO_4)_x$, wherein a is between 1 and 5, b is between 1 and 5, c is between 1 and 5, and x is between 1 and 10. In certain embodiments, a method of treating agricultural products includes: adding an agriculture treatment solution to an agricultural crop, the agriculture treatment solution comprising one or more metal salts and a chelating compound having the formula: $((NH_4)_2SO_4)_a \cdot (H_2SO_4)_b \cdot (H_2O)_c \cdot (NH_4HSO_4)_x$, wherein a is between 1 and 5, b is between 1 and 5, c is between 1 and 5, and x is between 1 and 10.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
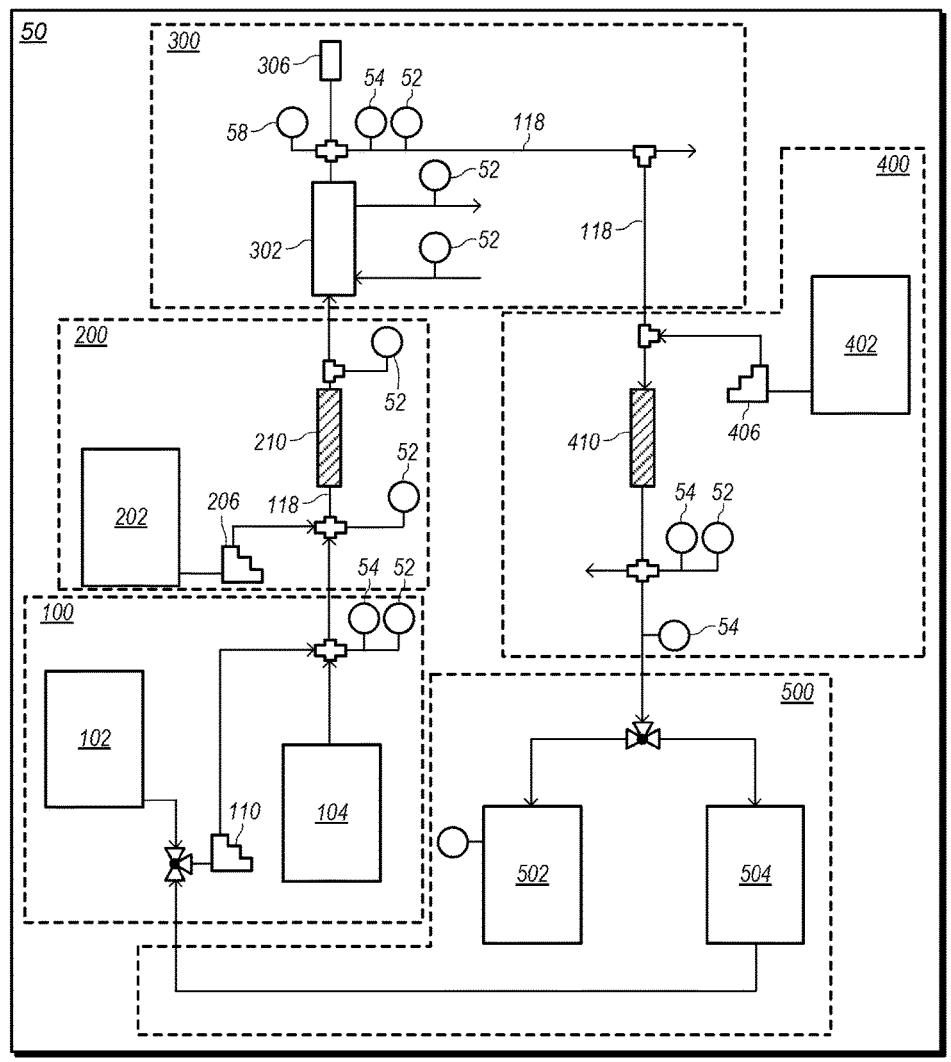
FIG. 1 depicts a representation of an embodiment of a process system for producing an embodiment of a base product fluid.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

The following examples are included to demonstrate preferred embodiments. It should be appreciated by those of skill in the art that the techniques disclosed in the examples which follow represent techniques discovered by the inventor to function well in the practice of the disclosed embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosed embodiments.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Chelation is a type of bonding of metal ions to at least two nonmetal ions that are components of a larger molecule. As used herein, bonding of metal ions to a chelant molecule can include any type of ionic bond or atomic attraction (e.g., hydrogen bonding). As used herein, a chelating agent can include organic or inorganic molecules or molecular aggregates or ordered molecular assemblages capable of forming a stable complex with one or more metal ions.

FIG. 1 depicts a representation of an embodiment of a process system for producing an embodiment of a base product fluid. In certain embodiments, process system 50 includes subsystems 100, 200, 300, 400, and 500. FIGS. 2-6 depict detailed representations of embodiments of subsystems 100, 200, 300, 400, and 500. Subsystems 100, 200, 300, 400, and 500 may combine to produce a base product fluid with desired properties.

Figure 2:
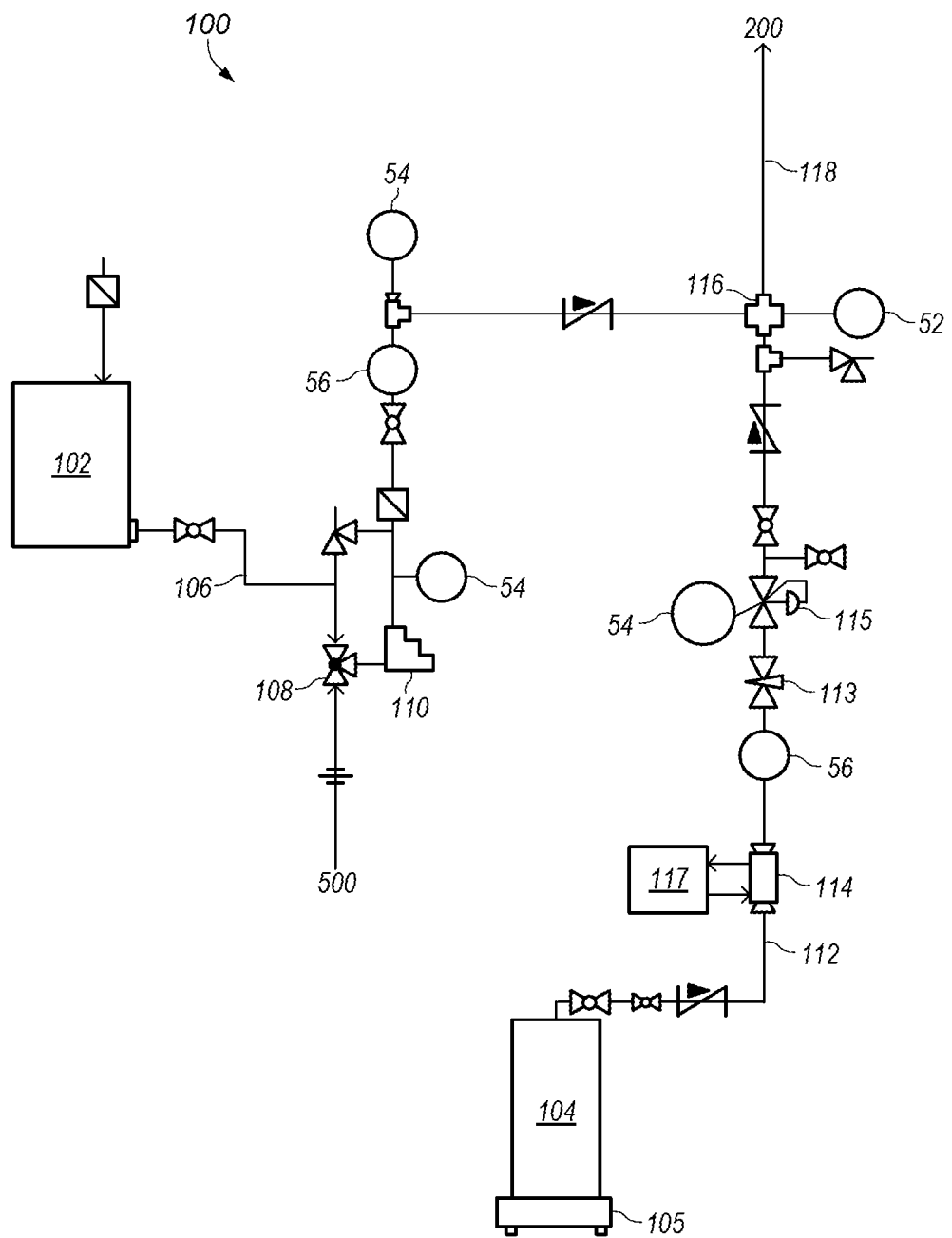
FIG. 2 depicts a detailed representation of an embodiment of a first subsystem.

FIG. 2 depicts a detailed representation of an embodiment of subsystem 100. Subsystem 100 may be a water and anhydrous liquid ammonia ($NH_3$) mixing system. In certain embodiments, subsystem 100 includes water tank 102 and ammonia cylinder 104. Ammonia cylinder 104 may be an anhydrous liquid ammonia cylinder. Water tank 102 may be a water storage tank with a desired capacity. For example, water tank 102 may have a capacity of about 300 gallons. FIG. 7 depicts an example of an embodiment of water tank 102. As shown in FIG. 2, water tank 102 provides water into water line 106. In some embodiments, water and/or water mixed with some additional materials (e.g., ammonia and/or sulfuric acid) collected in start-up tank 504 of subsystem 500 (shown in FIG. 6) during startup of process system 50 is added at 108.

Pump 110 may be used to control the flow of water through water line 106. Pump 110 may be, for example, a metering pump or a variable frequency drive pump. In some embodiments, pump 110 is a variable frequency drive pump operating at a frequency between about 15 Hz and about 55 Hz. In certain embodiments, the flowrate of water is controlled at a desired flowrate. For example, the flowrate of water may be between about 0.5 gpm (gallons per minute) and about 3 gpm. In some embodiments, the flowrate of water is between about 0.65 gpm and about 2.5 gpm. The flowrate of water may be adjusted to provide a different desired output rate for product from system 50.

Figure 8:
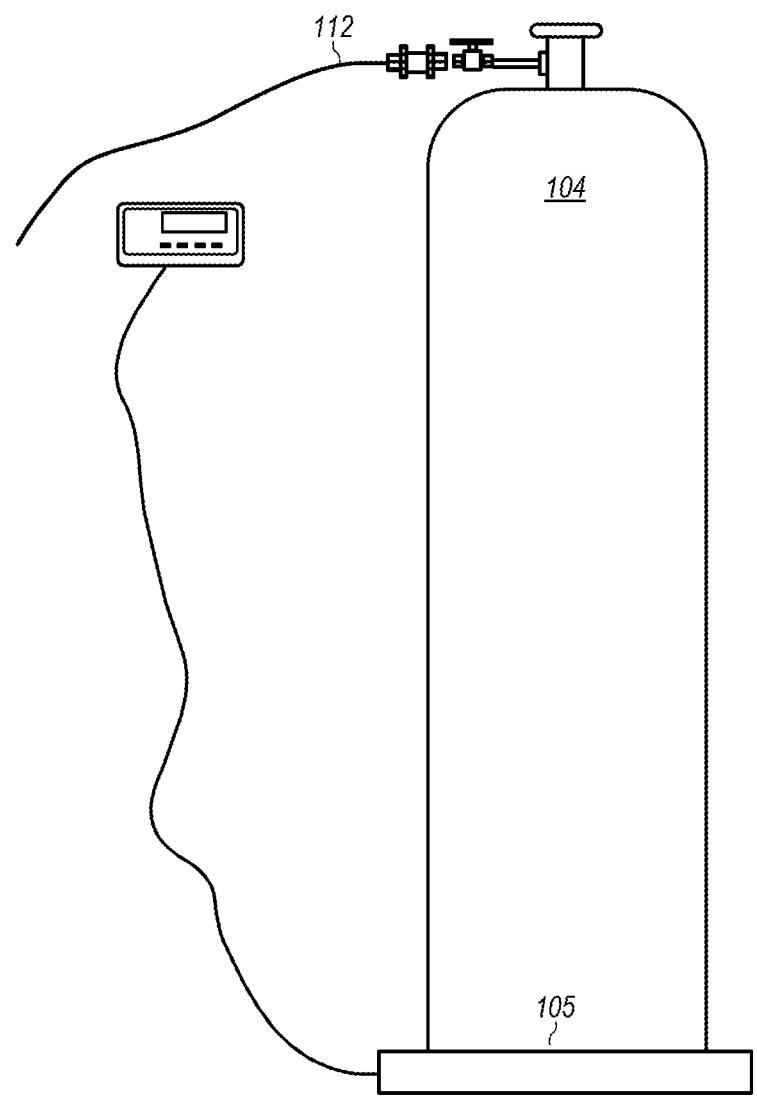
FIG. 8 depicts an example of an embodiment of an anhydrous liquid ammonia cylinder.

Ammonia cylinder 104 may be a pressure cylinder designed for use with anhydrous liquid ammonia. FIG. 8 depicts an example of an embodiment of ammonia cylinder 104. Ammonia cylinder 104 may have a weight of, for example, 140 lbs. Scale 105 may be used to monitor a weight of ammonia cylinder 104. As shown in FIG. 2, ammonia cylinder 104 may provide anhydrous liquid ammonia into ammonia line 112. The anhydrous liquid ammonia may be cooled using heat exchanger 114 located on ammonia line 112. Heat exchanger 114 may be, for example, a heat exchanger that circulates cooling fluid from chiller 117 to cool the anhydrous liquid ammonia flowing through the heat exchanger. In certain embodiments, chiller 117 circulates cooling fluid at a temperature below about 18° F. to maintain the ammonia as liquid ammonia at elevated pressures (e.g., pressures above atmospheric pressure).

The flow of ammonia through ammonia line 112 may be controlled using valve 113 located on the ammonia line. Valve 113 may be, for example, a needle valve. In some embodiments, the flowrate of anhydrous liquid ammonia is between about 3 gph (gallons per hour) and about 15 gph. In some embodiments, the flowrate of anhydrous liquid ammonia is between about 3 gph and about 6 gph or between about 3 gph and about 5 gph. The pressure of ammonia in ammonia line 112 may be controlled using pressure regulator 115. Pressure regulator 115 may be, for example, a forward pressure regulator. In some embodiments, the pressure of ammonia is about 60 psig. At a pressure of about 60 psig, heat exchanger 114 needs to cool the ammonia to a temperature of about 43° F. to maintain the ammonia as liquid ammonia. The pressure of ammonia and/or the temperature of cooling fluid from chiller 117 may be adjusted as desired or needed to ensure ammonia flowing through heat exchanger 114 is maintained as liquid ammonia. In some embodiments, ammonia line 112 is insulated to maintain the ammonia in the liquid state (e.g., keep the ammonia from boiling in the ammonia line).

In certain embodiments, liquid ammonia in ammonia line 112 is combined with water from water line 106 at junction 116 and the combined ammonia/water fluid enters process line 118. Using liquid ammonia (instead of ammonia gas) inhibits flashing of products of reaction between ammonia, sulfuric acid, and water. In certain embodiments, water and ammonia are combined at a desired weight ratio. For example, in some embodiments, water and ammonia are combined with a weight ratio of about 15.6:1 (water:ammonia). In some embodiments, the weight ratio of water to ammonia is between about 10:1 and about 20:1, between about 12:1 and about 18:1, or between about 14:1 and 16:1.

Figure 3:
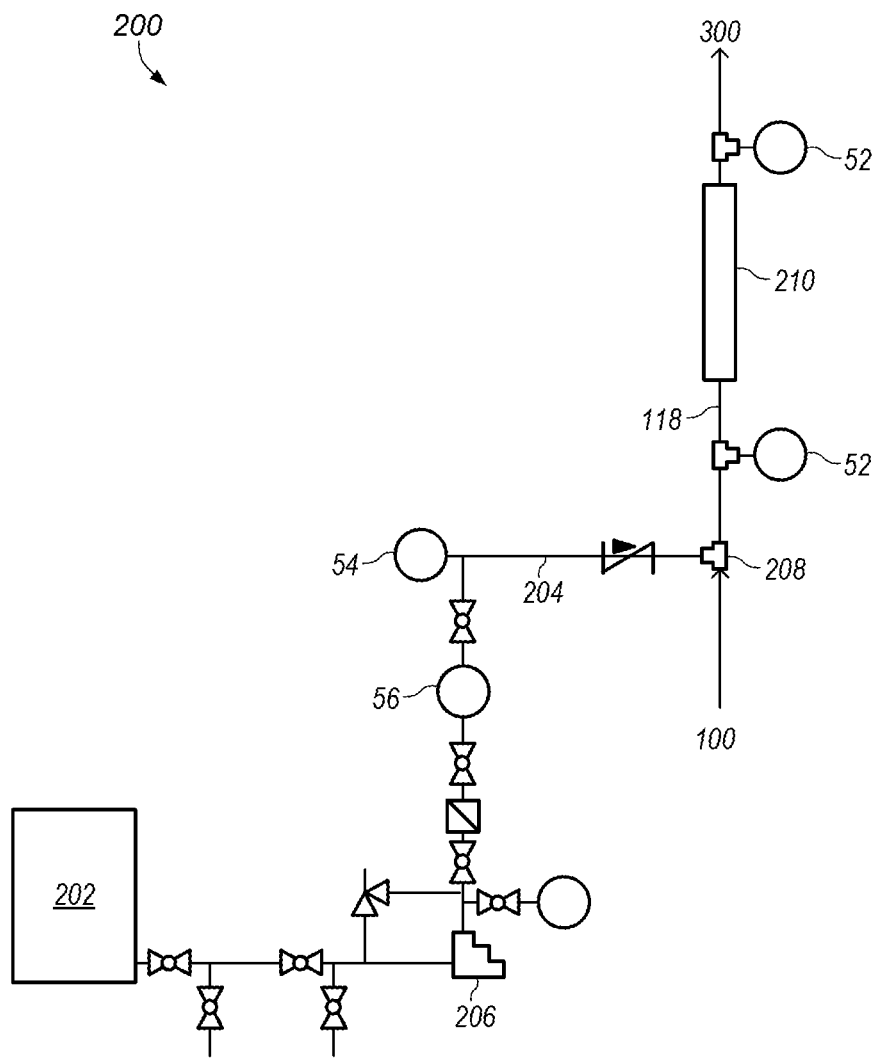
FIG. 3 depicts a detailed representation of an embodiment of a second subsystem.

Process line 118 may provide the ammonia/water fluid to subsystem 200, shown in FIG. 3. FIG. 3 depicts a detailed representation of an embodiment of subsystem 200. Subsystem 200 may be a first reactor system. In certain embodiments, subsystem 200 is used to react the ammonia/water fluid with a small (first) portion of sulfuric acid ($H_2SO_4$).

Figure 9:
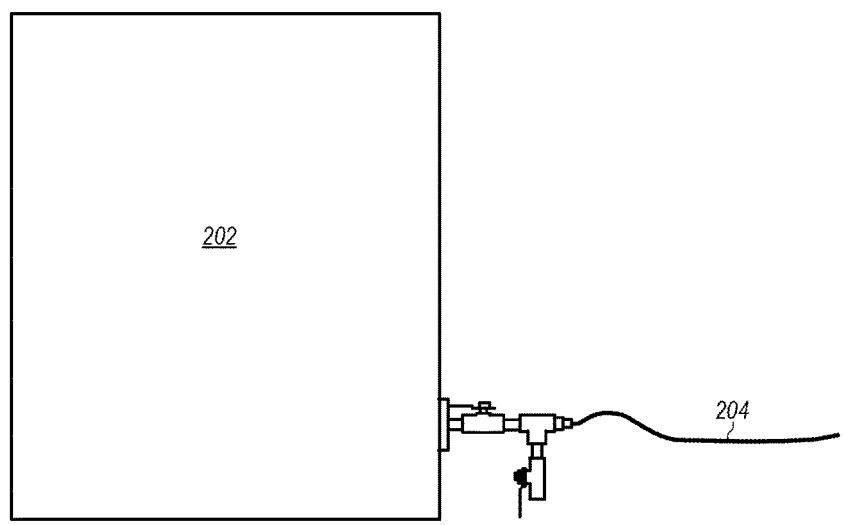
FIG. 9 depicts an example of an embodiment of an acid tank.

Sulfuric acid may be stored in acid tank 202. FIG. 9 depicts an example of an embodiment of acid tank 202. Acid tank 202 may be an acid storage tank with a desired capacity. For example, acid tank 202 may have a capacity of about 120 gallons. As shown in FIG. 3, acid tank 202 provides acid (e.g., sulfuric acid) into acid line 204. Pump 206 may be used to control the flow of acid through acid line 204. Pump 206 may be, for example, a metering pump or a variable frequency drive pump. In some embodiments, pump 206 is a variable frequency drive pump operating at a frequency between about 15 Hz and about 55 Hz.

Acid line 204 may couple with process line 118 at junction 208 to add the acid to the ammonia/water fluid. In some embodiments, acid in acid line 204 has a flowrate in a range between about 200 ml/min and about 1200 ml/min, between about 500 ml/min and about 1200 ml/min, or between about 600 ml/min and about 1000 ml/min. In certain embodiments, acid is added to the ammonia/water fluid at a desired weight ratio. For example, in some embodiments, the ammonia/water fluid to acid weight ratio is about 7.2:1. In some embodiments, the weight ratio of ammonia/water fluid to acid is between about 5:1 and about 9:1, between about 6:1 and about 8:1, or between about 6.5:1 and 7.5:1.

The combined acid/ammonia/water fluid may then flow through mixer 210. Mixer 210 may be, for example, a static mixer. A mixed fluid of acid, ammonia, and water may flow out of mixer 210 and be provided to subsystem 300, shown in FIG. 4. In certain embodiments, the pH of the combined acid/ammonia/water fluid in mixer 210 is controlled. For example, the pH of the combined acid/ammonia/water fluid in mixer 210 may be controlled to be between a pH of about 1 and a pH of about 9.

Figure 4:
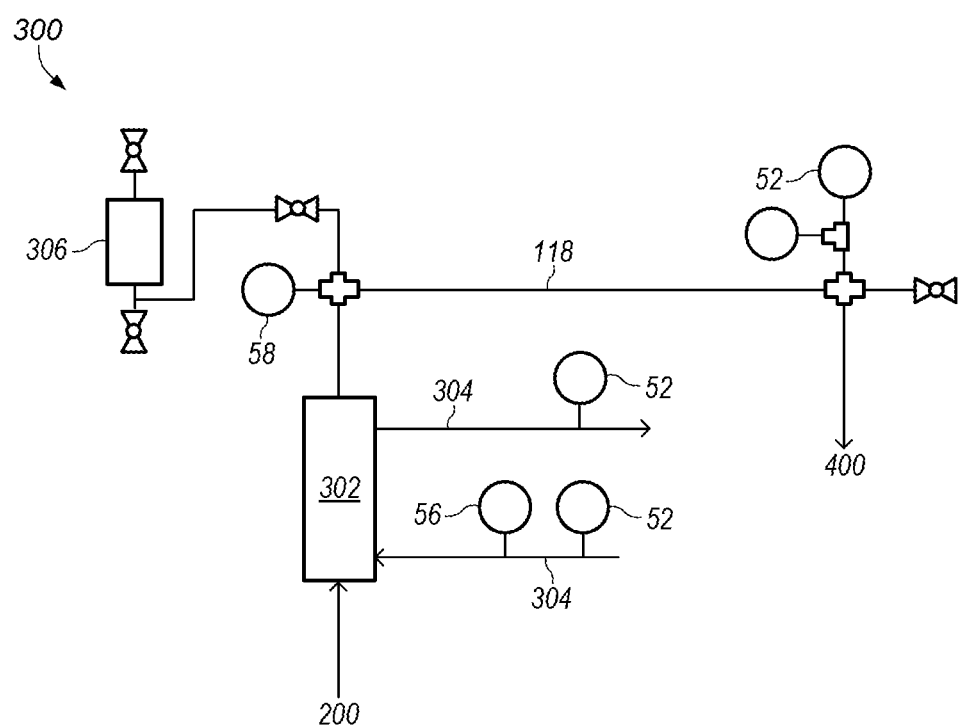
FIG. 4 depicts a detailed representation of an embodiment of a third subsystem.

FIG. 4 depicts a detailed representation of an embodiment of subsystem 300. Subsystem 300 may be a heat exchanger system. In certain embodiments, subsystem 300 includes heat exchanger 302 in-line with process line 118. Heat exchanger 302 may cool the mixed fluid as the mixed fluid flows through the heat exchanger. Cooling of the mixed fluid may be needed as the mixing of the ammonia/water fluid with sulfuric acid is exothermic. Cooling fluid 304 may be circulated through heat exchanger 304 to cool the mixed fluid. In certain embodiments, cooling fluid 304 is water. In some embodiments, cooling fluid 304 enters heat exchanger 302 at a temperature of at most about 65° F. and circulates through the heat exchanger at a flow rate of at least about 5 gpm (gallons per minute).

In certain embodiments, heat exchanger 302 cools the mixed fluid by at least about 50° F., by at least about 75° F., or by at least about 150° F. For example, heat exchanger 302 may cool the mix fluid from a temperature of about 200° F. to a temperature of about 75° F.

Figure 5:
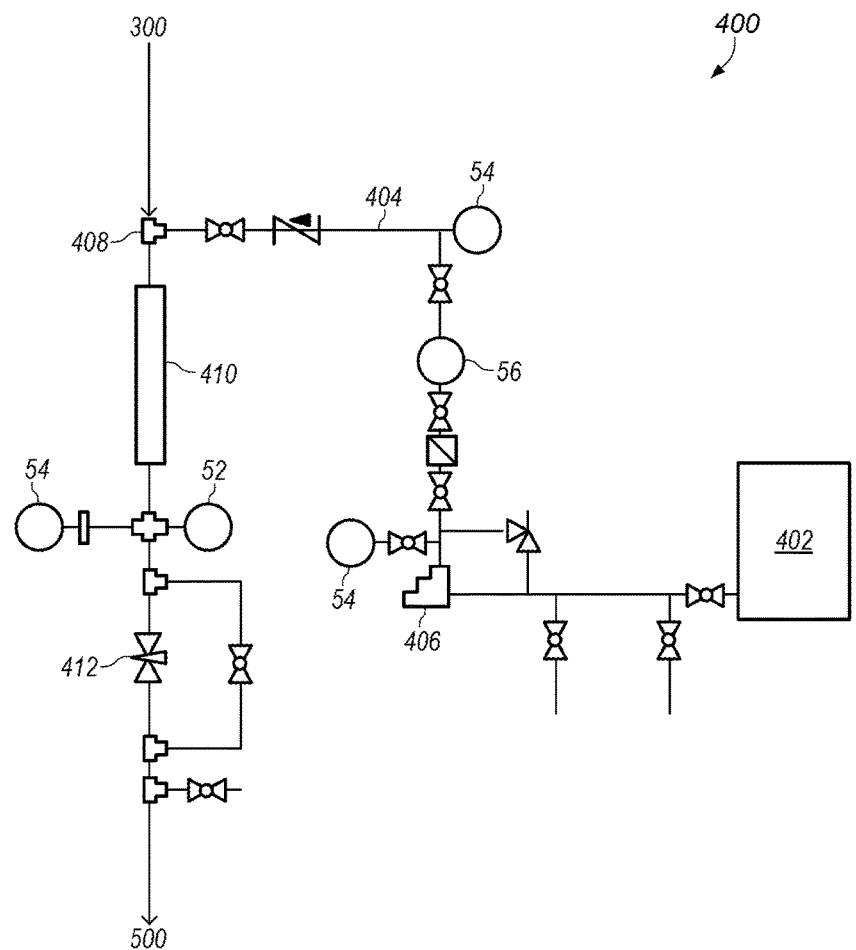
FIG. 5 depicts a detailed representation of an embodiment of a fourth subsystem.

In some embodiments, pulsation dampener 306 is coupled to process line 118 downstream of heat exchanger 302. After pulsation dampener 306, process line 118 may provide the (cooled) mixed fluid to subsystem 400, shown in FIG. 5. FIG. 5 depicts a detailed representation of an embodiment of subsystem 400. Subsystem 400 may be a second reactor system. In certain embodiments, subsystem 400 is used to add and react additional sulfuric acid (e.g., a second portion of sulfuric acid) to the mixed fluid.

Figure 10:
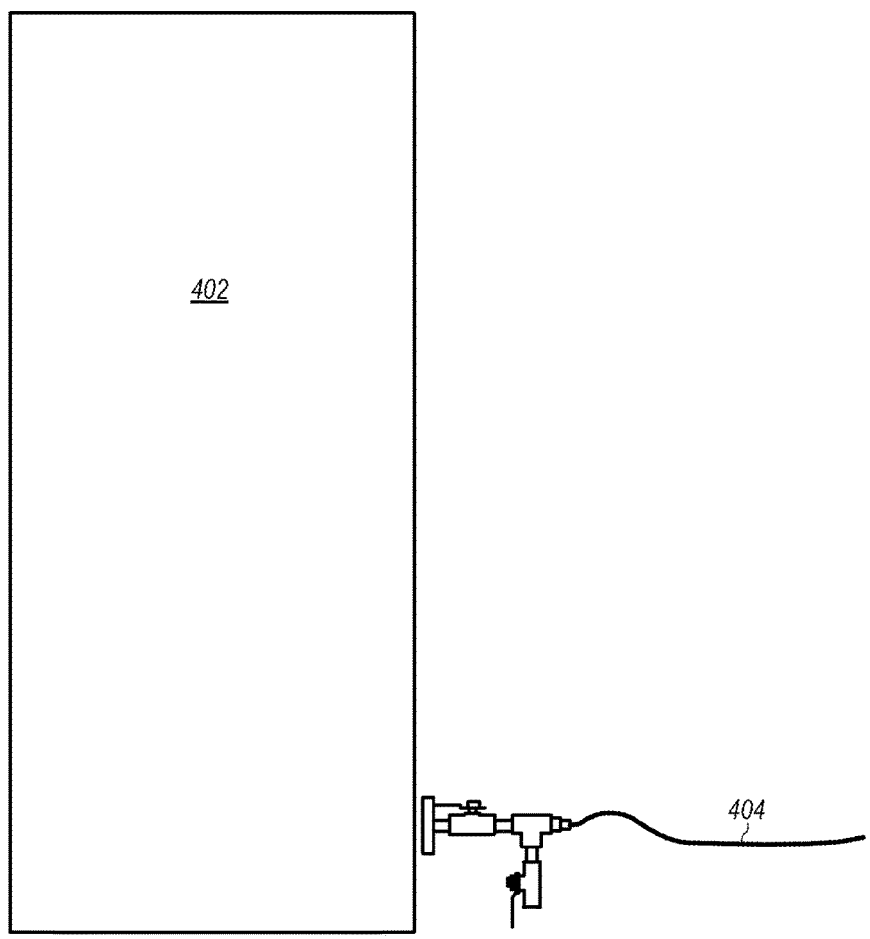
FIG. 10 depicts an example of another embodiment of an acid tank.

Sulfuric acid may be stored in acid tank 402. FIG. 10 depicts an example of an embodiment of acid tank 402. Acid tank 402 may be an acid storage tank with a desired capacity. For example, acid tank 402 may have a capacity of about 500 gallons. As shown in FIG. 5, acid tank 402 provides acid (e.g., sulfuric acid) into acid line 404. Pump 406 may be used to control the flow of acid through acid line 406. Pump 406 may be, for example, a metering pump or a variable frequency drive pump. In some embodiments, pump 406 is a variable frequency drive pump operating at a frequency between about 15 Hz and about 55 Hz.

Acid line 404 may couple with process line 118 at junction 408 to add the additional acid to the mixed fluid. In some embodiments, acid in acid line 404 has a flowrate in a range between about 1000 ml/min and about 5000 ml/min, between about 1100 ml/min and about 4900 ml/min, or between about 1200 ml/min and about 4800 ml/min. The new mixed fluid may then flow through mixer 410. In certain embodiments, the new mixed fluid has a pH of about zero. Mixer 410 may be, for example, a static mixer. A mixed fluid of acid, ammonia, and water may flow out of mixer 410 and be provided to subsystem 500, shown in FIG. 6.

In certain embodiments, as shown in FIG. 5, valve 412 is used to control a pressure of the mixed fluid as the fluid flows through process line 118. Controlling the pressure at valve 412 may control the pressure in process line 118 (e.g., adjusting the pressure at valve 412 adjusts the system pressure in subsystems 100-400). Valve 412 may be, for example, a needle valve. In some embodiments, valve 412 is used to adjust the system pressure after sulfuric acid addition begins in subsystem 200 (shown in FIG. 3) and/or subsystem 400 (shown in FIG. 5). In certain embodiments, the system pressure is between about 40 psig and about 80 psig. Other system pressures may also be used as needed or desired.

In certain embodiments, the additional (second) portion of sulfuric acid added in subsystem 400 (shown in FIG. 5) is larger than the (first) portion of sulfuric acid added in subsystem 200 (shown in FIG. 3). For example, a ratio of the second portion of sulfuric acid to the first portion of sulfuric acid by weight is about 6:1. In some embodiments, the ratio of the second portion of sulfuric acid to the first portion of sulfuric acid by weight is between about 2:1 and about 7:1, between about 3:1 and about 6:1, or between about 3.5:1 and about 5.5:1.

Figure 6:
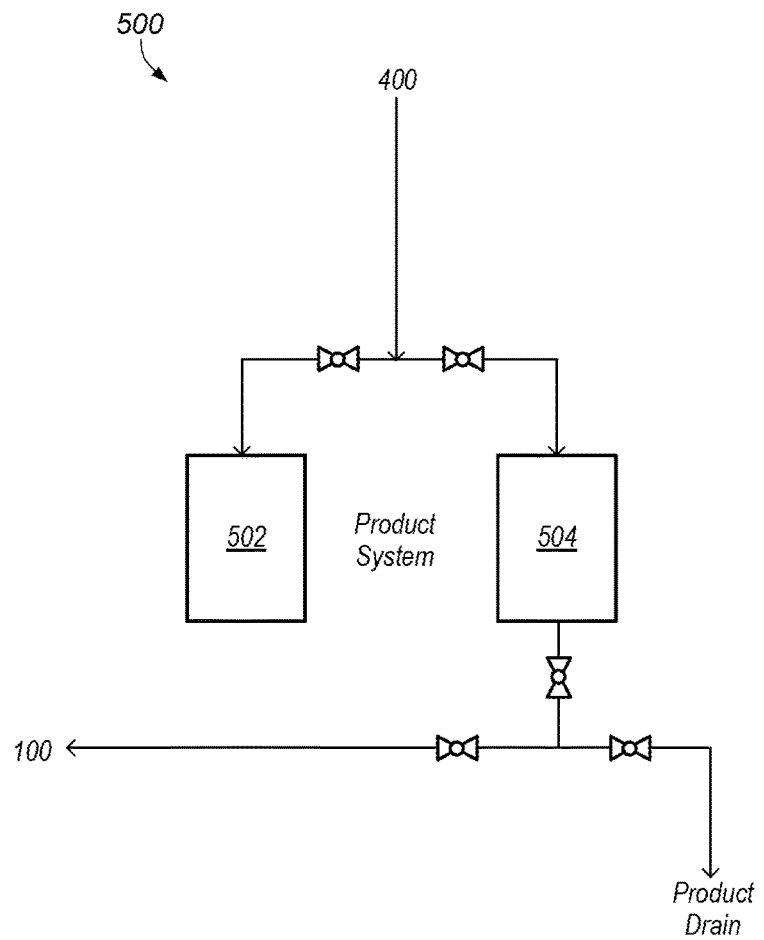
FIG. 6 depicts a detailed representation of an embodiment of a fifth subsystem.
Figure 7:
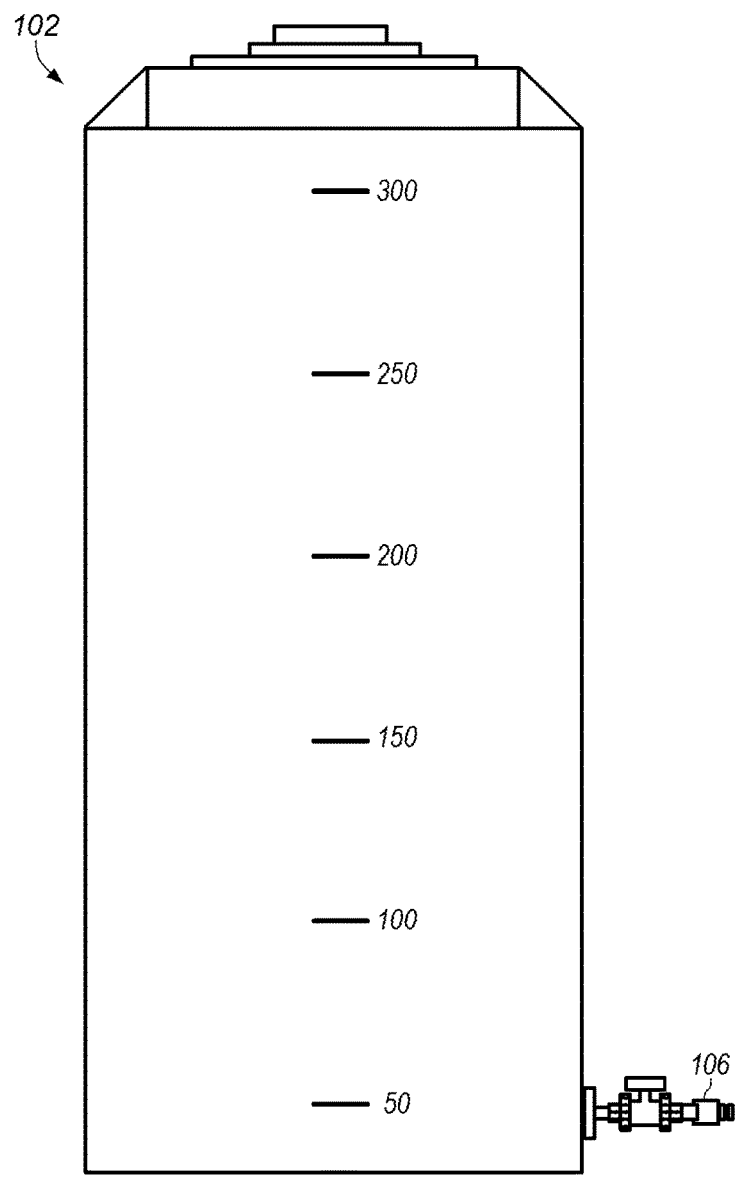
FIG. 7 depicts an example of an embodiment of a water tank.

FIG. 6 depicts a detailed representation of an embodiment of subsystem 500. Subsystem 500 may be a product system. In certain embodiments, subsystem 500 includes product tank 502 and start-up tank 504. Product tank 502 may be a storage tank with a desired capacity. For example, product tank 502 may have a capacity of about 20000 gallons. Product tank 502 may be used to collect a base product fluid produced by system 50 (e.g., the mixed fluid produced after the addition of the second portion of sulfuric acid).

Figure 11:
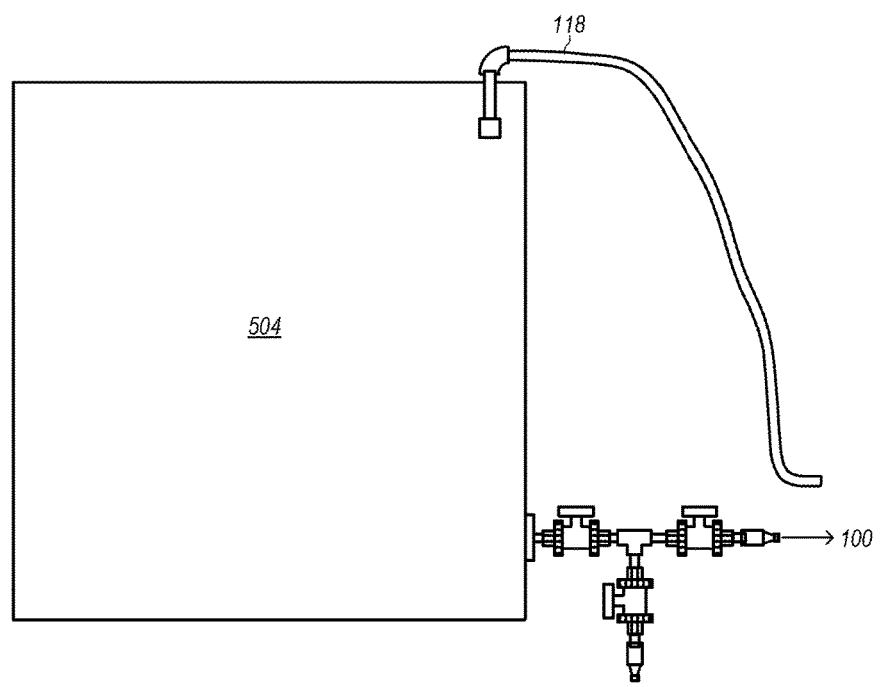
FIG. 11 depicts an example of an embodiment of a start-up tank.

FIG. 11 depicts an example of an embodiment of start-up tank 504. As shown in FIGS. 1 and 6, start-up tank 504 may be used to collect fluids during start-up periods of system 50. Start-up periods of system 50 may be periods before the base product fluid with desired properties is produced. For example, start-up periods of system 50 may include periods before the second portion of sulfuric acid is added to the mixed fluid in subsystem 400, shown in FIG. 5. Thus, start-up periods of system 50 may include times (periods) for bringing water and/or ammonia up to desired pressures and/or flowrates without the addition of any sulfuric acid. Addition of the first portion of sulfuric acid (in subsystem 200 depicted in FIG. 3) may also be part of a start-up period as well as any ramp-up portion of adding the second portion of sulfuric acid to the mixed fluid (in subsystem 400 depicted in FIG. 5) (e.g., ramp-up of adding the second portion before stable (steady-state) conditions exist in the system).

As the desired base product fluid is not produced during these times, the fluids produced during the start-up periods may be collected and stored in start-up tank 504. In some embodiments, fluids stored in start-up tank 504 are recycled into water line 106 at 108 in subsystem 100, as shown in FIG. 2. For example, fluids collected before any sulfuric acid is added (e.g., fluids of water and ammonia) may be provided into water line 106 and used as part of the water/ammonia feed for system 50. In some embodiments, fluids stored in start-up tank 504 are drained.

After the start-up period ends, product flow in subsystem 500, shown in FIG. 6, may be switched from start-up tank 504 to product tank 502. After switching flow between the tanks, pressure in the system may need to be adjusted to return the system to stable (steady-state) conditions.

In certain embodiments, temperatures, pressures, and/or pH levels are monitored at one or more locations in system 50. Temperatures, pressures, flowrates, and/or pH levels may be monitored using sensors located along process line 118 and/or other lines (e.g., water lines and/or acid lines) in system 50. For example, temperatures may be monitored using temperature sensors 52, pressures may be monitored using pressure sensors 54, flowrates may be monitored using flowrate sensors 56 (e.g., mass flow controllers), and pH level may be monitored using pH monitors 58, shown in FIGS. 1-6. Data from these sensors may be used to monitor and/or control the operation of system 50.

As shown above, system 50 may be used to produce a base product fluid from a mixture of water, ammonia, and sulfuric acid. In certain embodiments, system 50 produces the base product fluid at desired outputs and stores/collects the base product fluid in product tank 502. For example, system 50 may produce between about 1 gpm (gallon per minute) and about 4 gpm of the base product fluid under steady-state (stable) conditions (e.g., under steady-state conditions when the second portion of sulfuric acid is being added to the mixed fluid). Other desired outputs of the base product fluid may be produced by system 50 by adjusting one or more properties of the system. Properties that may be adjusted include, but are not limited to, flowrates of water, ammonia, and/or sulfuric acid, pressures, pH, and temperatures. In some embodiments, the sizes of piping, tanks, valves, etc. may also need to be adjusted to produce different desired outputs from system 50.

In certain embodiments, orifice mixers are used instead of or along with mixer 210, depicted in FIG. 3, to provide different mixing between water, ammonia, and the first portion of sulfuric acid in subsystems 100 and 200, depicted in FIGS. 2 and 3, respectively. For example, orifice mixers may be provided inline to mix fluids during or after when one fluid is injected into another fluid. In some embodiments, the sizes and/or locations of the orifice mixers are varied along with variations in the size, location, and/or number of mixer 210 (e.g., static mixer), depicted in FIG. 3. Variations of the number, size, and/or locations of the orifice mixers and/or the static mixers may provide different desirable properties in the base product fluid produced by system 50.

Figure 12:
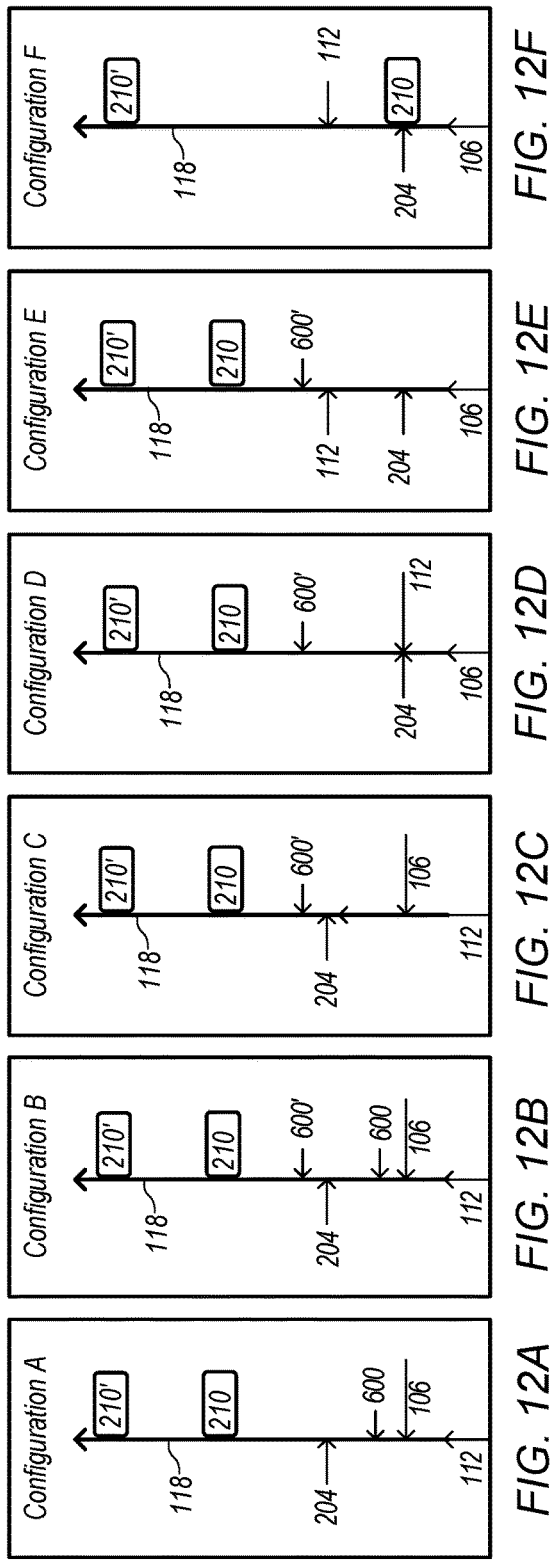
FIGS. 12A-F depicts various mixer configurations of orifice mixers and static mixers.

FIGS. 12A-F depicts various mixer configurations of orifice mixers and static mixers suitable for use in system 50 to provide different properties in the base product fluid. FIG. 12A depicts a mixer configuration with orifice mixer 600 positioned in process line 118 immediately after water (from water line 106) is combined with ammonia (from ammonia line 112) and before sulfuric acid (from acid line 204) is added to the water/ammonia mixture. Orifice mixer 600 may be, for example, a 0.3" orifice mixer. FIG. 12B depicts a variation of the mixer configuration in FIG. 12A with a second orifice mixer 600' positioned in process line 118 immediately after sulfuric acid is added. In addition, static mixers 210 and 210' are positioned after second orifice mixer 600'. Second orifice mixer 600' may be, for example, a 0.4" orifice mixer. Static mixer 210 may be a 3 element static mixer while static mixer 210' may be a 5 element static mixer.

FIG. 12C depicts a variation of the mixer configuration in FIG. 12B with first orifice mixer 600 removed and ammonia (from ammonia line 112) now injected at the same location as sulfuric acid (e.g., using a long injector for the ammonia). FIG. 12D depicts a variation of the mixer configuration in FIG. 12C with ammonia (from ammonia line 112) injected at the same location as sulfuric acid with a short length injector. FIG. 12E depicts a variation of the mixer configuration in FIG. 12D with ammonia (from ammonia line 112) injected downstream of the sulfuric acid with a short length injector. FIG. 12F depicts a variation of the mixer configuration in FIG. 12E with ammonia (from ammonia line 112) injected downstream of first static mixer 210 and no orifice mixers.

The base product fluid, produced by system 50 and its related process described above in the embodiments of FIGS. 1-12, is a metal chelating agent that shows improved properties compared to other water, ammonia, and sulfuric acid based metal chelating agents. For example, in some embodiments, the base product fluid produced by system 50 may have UV absorbance even though the component fluids (e.g., water, ammonia, and sulfuric acid) themselves have little to no UV absorption. In certain embodiments, the base product fluid has a UV absorbance of at least about 0.75 at 254 nm. In some embodiments, the base product fluid has a UV absorbance of at least about 0.7 at 254 nm, at least about 0.8 at 254 nm, at least about 0.85 at 254 nm, at least about 1 at 254 nm, or at least about 1.5 at 254 nm. In certain embodiments, the base product fluid has a UV absorbance of at least about 0.5 in a wavelength range between about 200 nm and about 300 nm. In some embodiments, the base product fluid has a UV absorbance of at least about 0.6, at least about 0.7, or at least about 0.75 in a wavelength range between about 200 nm and about 300 nm.

Figure 13:
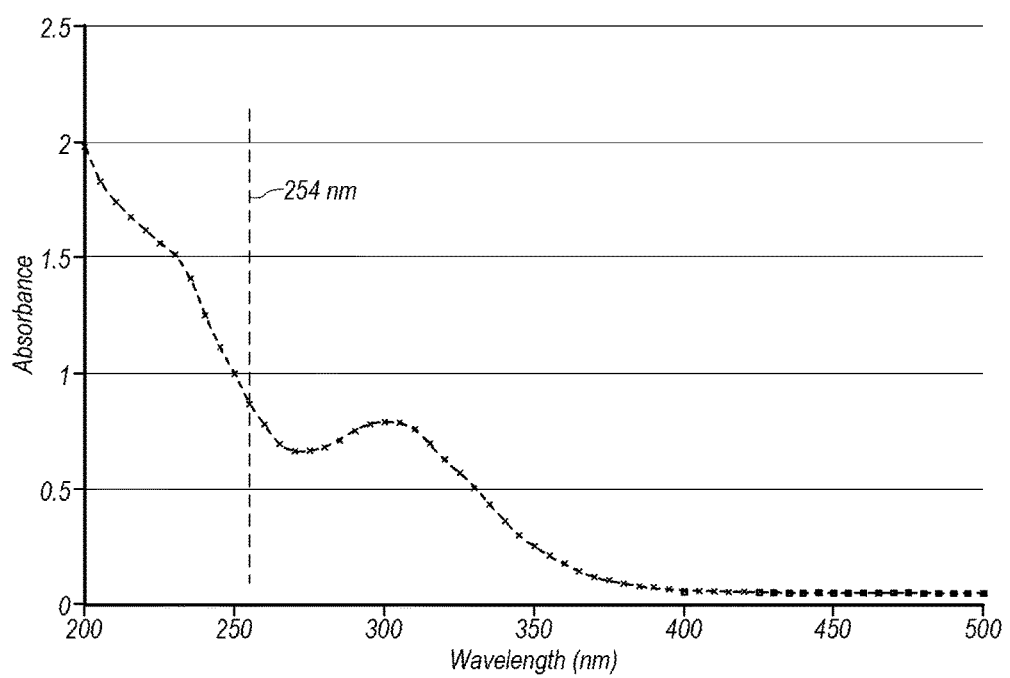
FIG. 13 depicts a plot of UV absorbance versus wavelength for the base product fluid.

The base product fluid may have UV absorption properties due to clustering of molecular compounds of ammonium sulfate, ammonium bisulfate, sulfuric acid, and/or water in the base product fluid. In certain embodiments, the clusters of molecular compounds have a variety (plurality) of sizes. FIG. 13 depicts a plot of UV absorbance versus wavelength for the base product fluid. The variety of sizes may produce UV absorption at a variety of wavelengths, as shown in FIG. 13. Examples of ammonium sulfate, ammonium bisulfate, and sulfuric acid are given in: Joseph W. DePalma et al. (2012): Structure and Energetics of Nanometer Size Clusters of Sulfuric Acid with Ammonia and Dimethylamine, The Journal of Physical Chemistry, 116, 1030-1040, which is incorporated by reference as if fully set forth herein.

Figure 14:
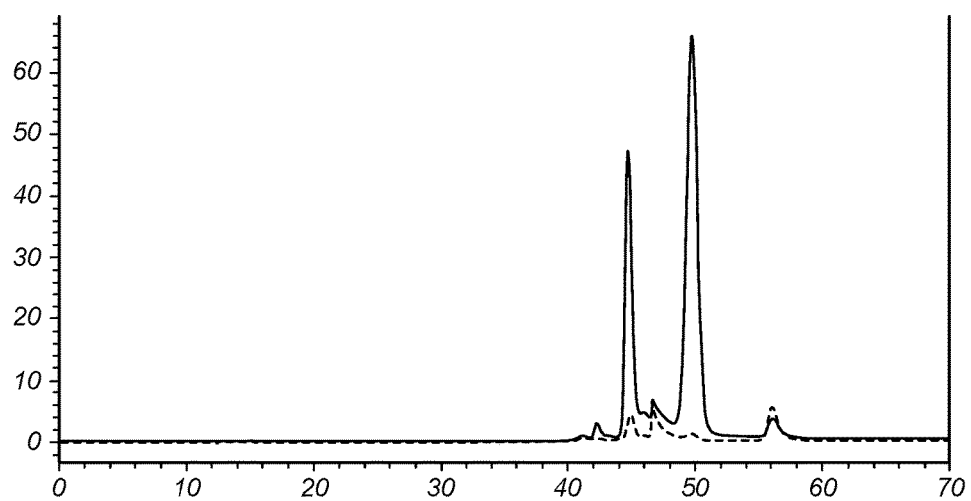
FIG. 14 depicts a 210 nm chromatogram of the base product fluid using SE-HPLC.

Aqueous size-exclusion high-performance liquid chromatography (SE-HPLC) tests on the base product fluid were performed to separate the components in the base product fluid. FIG. 14 depicts a 210 nm chromatogram of the base product fluid using SE-HPLC. As shown in FIG. 14, the base product fluid chromatogram has 5 different peaks showing different molecular weight structures are present in the base product fluid. These different molecular weight structures may be due to clustering in the base product fluid.

Figure 15:
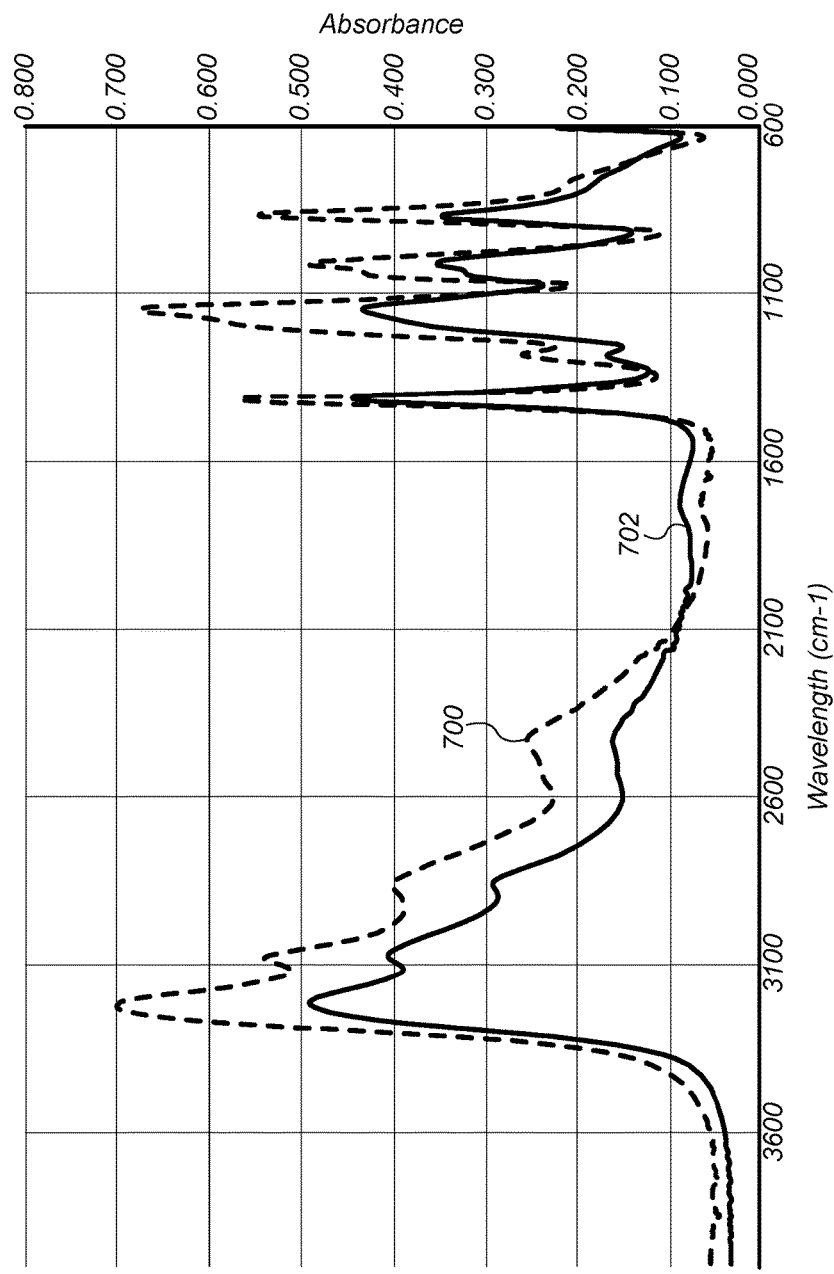
FIG. 15 depicts a plot of infrared (IR) spectra comparing the base product to ammonium bisulfate (($NH_4$)$HSO_4$).

FIG. 15 depicts a plot of infrared (IR) spectra comparing the base product to ammonium bisulfate ($(NH_4)HSO_4$). Plot 700 is an IR spectrum for ammonium bisulfate powder. Plot 702 is an IR spectrum for a solid base product. The solid base product may be isolated from the base product fluid (e.g., the base product fluid is dehydrated to form the solid base product). The IR spectrum were obtained on a Nicolet iS50-FT-IR spectrophotometer with a Smart iTR for solid and liquid samples. As shown in FIG. 15, plot 702 for the base product fluid includes several IR bands characteristic of ammonium bisulfate.

Elemental analysis of the solid base product shows that that only nitrogen, oxygen, sulfur, and hydrogen are present in the base product. TABLE 1 shows elemental analysis mass percentages of the base product along with elemental mass percentages for possible components of the base product (ammonium bisulfate, ammonium sulfate, sulfuric acid, and water):

TABLE 1

| ELEMENT | BASE PRODUCT | $(NH_4)HSO_4$ | $(NH_4)_2SO_4$ | $H_2SO_4$ | $H_2O$ |
| --- | --- | --- | --- | --- | --- |
| HYDROGEN | 4.70% | 4.38% | 6.10% | 2.06% | 11.19% |
| NITROGEN | 14.80% | 12.17% | 21.20% | — | — |
| SULFUR | 26.55% | 27.85% | 24.26% | 32.69% | — |
| OXYGEN | 53.95% | 55.60% | 48.43% | 65.25% | 88.81% |

As shown in TABLE 1, the base product fluid has elemental mass percentages that match elemental mass percentages associated with any of the possible components. Thus, the base product fluid may be a compound having these possible components in various amounts.

X-ray photoelectron spectroscopy (XPS) was also performed on the solid base product to confirm results of the elemental analysis. XPS was conducted on the base product using a Physical Electronics 5800 multi analysis tool. The survey scans were run at a step size of 1.6 eV resolution and a pass energy of 187.85 eV. The High Resolution spectra were taken at a pass energy of 23.5 eV and a step size of 0.1 eV. A low energy dispersed electron beam shower was used to neutralize the sample and used the C 1s, adventitious carbon, at 284.8 eV to shift the High Resolution spectra to this peak as a "standard". TABLE 2 displays the atomic percentage results of the XPS analysis.

TABLE 2

| | BASE PRODUCT Atomic % | | $(NH_4)HSO_4$ | $(NH_4)_2SO_4$ |
|---|---|---|---|---|
| | Normalized Survey XPS | Resolution XPS | Atomic % Theoretical | Theoretical |
| NITROGEN | 18.0 | 18.2 | 16.66 | 28.57 |
| OXYGEN | 65.9 | 64.6 | 66.66 | 57.17 |
| SULFUR | 16.1 | 17.2 | 16.66 | 14.28 |

As shown in TABLE 2, XPS data confirms the elemental analysis results that only nitrogen, oxygen, and sulfur (along with hydrogen) are present in the base product. XPS also showed that substantially all the nitrogen in the base product is in an oxidation state of −3 (oxidation state for nitrogen in ammonia) and substantially all the sulfur in the base product is in an oxidation state of +6 (oxidation state for sulfur in sulfate/bisulfate).

Figure 16:
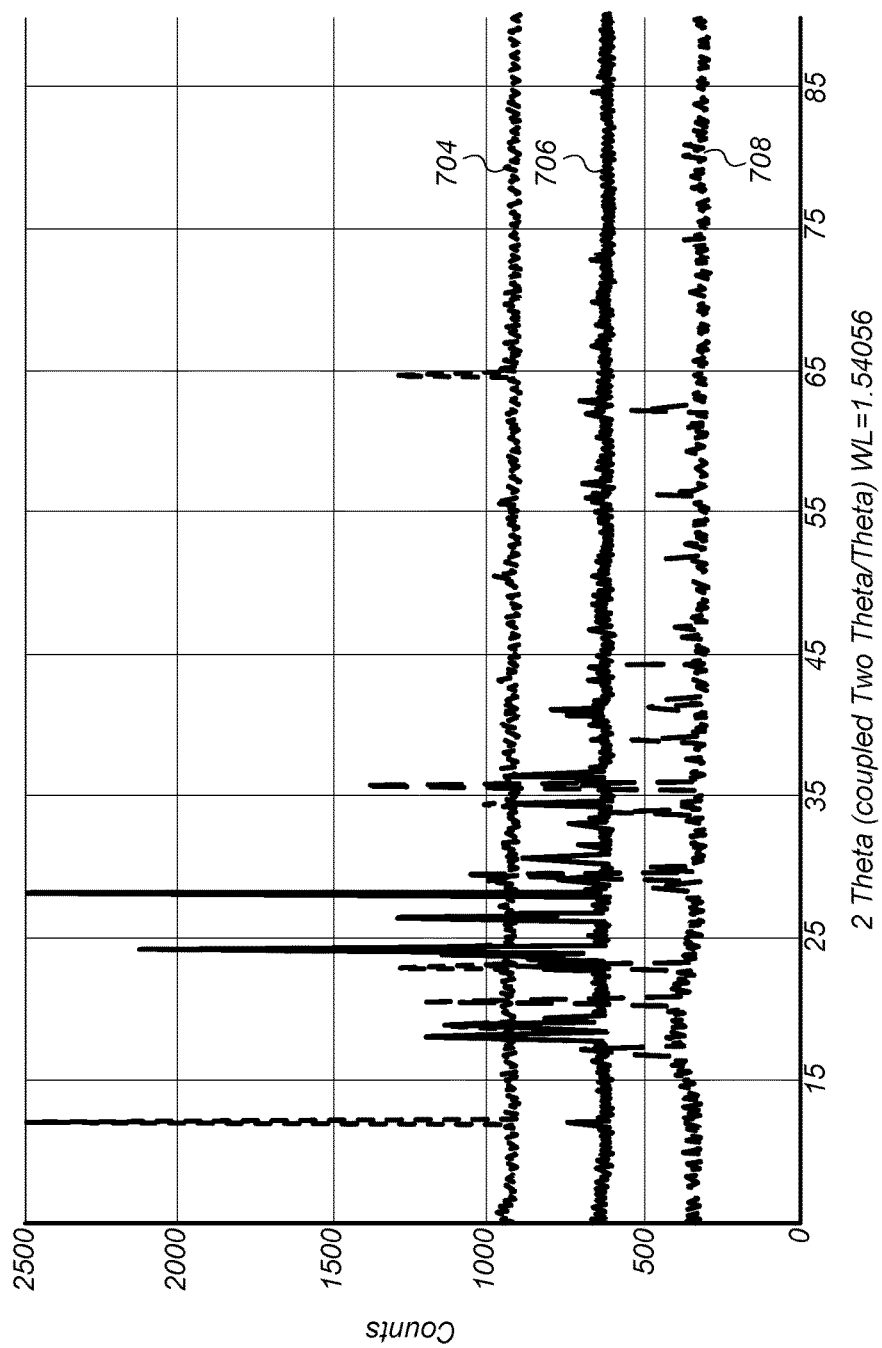
FIG. 16 depicts plots of X-ray diffraction analysis (XRD) spectra comparing the base product to ammonium bisulfate (($NH_4$)$HSO_4$) and ammonium sulfate (($NH_4$)$_2SO_4$).

FIG. 16 depicts plots of X-ray diffraction analysis (XRD) spectra comparing the solid base product to ammonium bisulfate $((NH_4)HSO_4)$ and ammonium sulfate $((NH_4)_2SO_4)$. Plot 704 is an XRD spectrum for ammonium bisulfate. Plot 706 is an XRD spectrum for the base product fluid. Plot 708 is an XRD spectrum for ammonium sulfate. Plot 706, while having some peaks identical to plots 704 and 708, also includes other peaks not found in the other plots. Thus, the XRD spectra shown in FIG. 16 indicate that the base product fluid is not ammonium bisulfate or ammonium sulfate.

Figure 17:
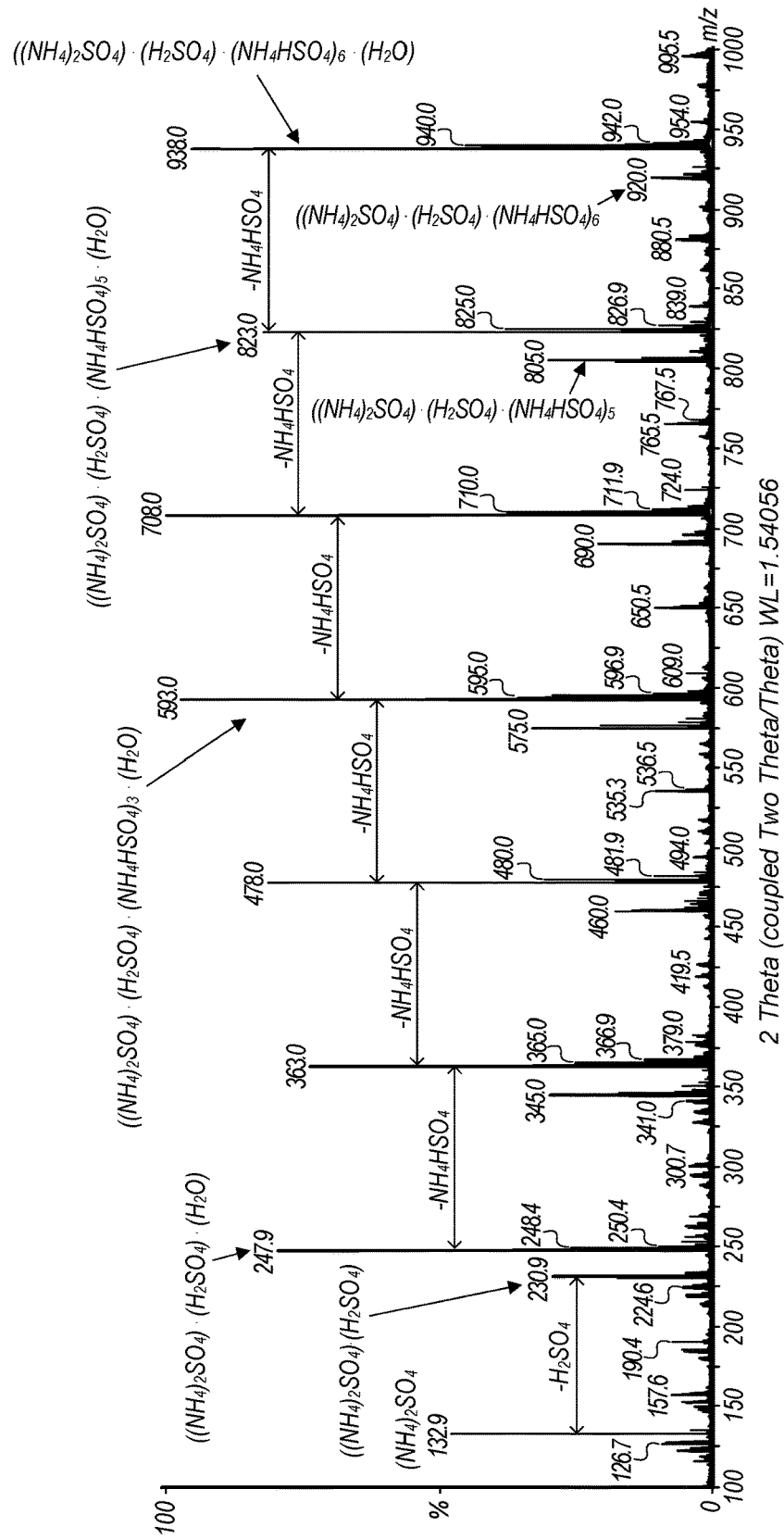
FIG. 17 depicts time-of-flight mass spectrometry (TOFMS) of the base product fluid.

FIG. 17 depicts time-of-flight mass spectrometry (TOFMS) of the base product fluid. TOFMS was conducted using a nano ESI MS using Q-Tof Premier from Waters with MassLynx 4.1 software to control the acquisition and data analysis. The base product fluid sample was injected as is and analyzed in both positive and negative ion mode (V mode). The source parameters were: Positive ion mode, Capillary 0.1-1 kV, Sampling cone 74V, Extraction cone 3.6V and Ion Guide 2.5V. As shown in FIG. 17, multiple ammonium bisulfate units fragment off the base product fluid, which may indicate that the number of ammonium bisulfate units may vary between compounds in the base product fluid.

Based on the above experimental data, the base product fluid may include molecular compounds having various amounts of ammonium sulfate, ammonium bisulfate, sulfuric acid, and water with the molecular compounds being in cluster-type formations. Thus, a molecular compound in the base product fluid may be described as a clustered combination of ammonium sulfate, ammonium bisulfate, sulfuric acid, and water. In certain embodiments, the molecular compound in the base product fluid is described by the formula: $((NH_4)_2SO_4)_a \cdot (H_2SO_4)_b \cdot (H_2O)_c \cdot (NH_4HSO_4)_x$ with a, b, c, and x varying between molecular compounds in the base product fluid depending on cluster sizes of the molecular compounds. In certain embodiments, a is at least 1, b is at least 1, c is at least 1, and x is at least 1 in the formula for the molecular compound in the base product fluid. In certain embodiments, a is between 1 and 5, b is between 1 and 5, c is between 1 and 5, and x is between 1 and 10. In some embodiments, a is between 1 and 3, b is between 1 and 3, c is between 1 and 3, and x is between 1 and 6. In one embodiment, the base product fluid includes a molecular compound having the formula: $((NH_4)_2SO_4)_1 \cdot (H_2SO_4)_1 \cdot (H_2O)_1 \cdot (NH_4HSO_4)_x$; where x is between 1 and 6.

In certain embodiments, the molecular compound in the base product fluid has the formula: $((NH_4)_2SO_4)_a \cdot (H_2SO_4)_b \cdot (H_2O)_c \cdot (NH_4HSO_4)_x$; with a mass percentage of hydrogen being between about 3% and about 6%, a mass percentage of nitrogen being between about 10% and about 15%, a mass percentage of sulfur being between about 25% and about 30%, and a mass percentage of oxygen being between about 52% and about 60%. In such embodiments, a is at least 1, b is at least 1, c is at least 1, and x is at least 1 for the molecular compound. In some embodiments, the molecular compound in the base product fluid has the formula: $((NH_4)_2SO_4)_a \cdot (H_2SO_4)_b \cdot (H_2O)_c \cdot (NH_4HSO_4)_x$; with a mass percentage of hydrogen being between about 4% and about 5%, a mass percentage of nitrogen being between about 11% and about 15%, a mass percentage of sulfur being between about 26% and about 28%, and a mass percentage of oxygen being between about 53% and about 57%. In one embodiment, the molecular compound in the base product fluid has the formula: $((NH_4)_2SO_4)_a \cdot (H_2SO_4)_b \cdot (H_2O)_c \cdot (NH_4HSO_4)_x$; with a mass percentage of hydrogen being about 4.7%, a mass percentage of nitrogen being about 14.8%, a mass percentage of sulfur being about 26.5%, and a mass percentage of oxygen being about 54%.

The molecular compound described above may be a chelating compound for metal salts (e.g., copper salts) in the base product fluid (e.g., the molecular compound is a metal chelating agent). Having the molecular compound in the base product fluid, as evidenced by the above experimental data, may provide improved properties in the base product fluid produced by system 50. For example, in some embodiments, the molecular compound may increase the rate of diffusion in water of copper and/or other metals added to the base product fluid. In some embodiments, the molecular compound may improve the transport of copper and/or other metals across a cell membrane when they are added to the base product fluid. The improved transport may increase the bioavailability and/or reactivity of the metal (e.g., copper) in an end product formed from the base product fluid. The increased bioavailability and/or reactivity may increase the effectiveness of the end product formed from the base product fluid. Increasing the effectiveness of the end product may allow smaller doses of the end product to be used for desired results (e.g., desirable results in various treatments in water-based systems). Additionally, unlike traditional chelating agents, the base product fluid with the molecular compound does generate heat with the addition of metals or metal salts to the base product fluid. The lack of heat generation may be an indicator of the absence of any coordination chemistry reactivity in the base product fluid.

Figure 18:
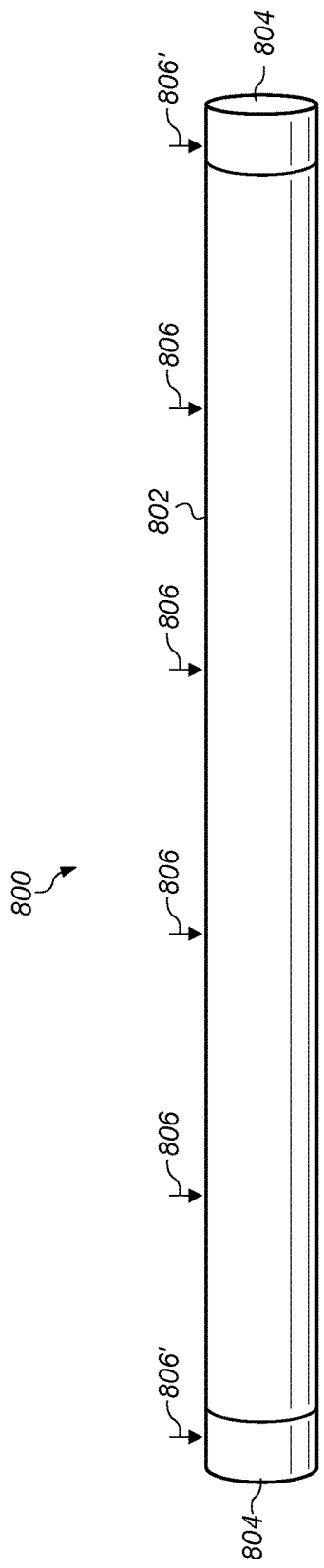
FIG. 18 depicts a side-view representation of a copper diffusion testing apparatus.

A diffusion testing apparatus was used to assess the diffusion efficiency of copper in water using the base product fluid with the molecular compound described above. FIG. 18 depicts a side-view representation of a copper diffusion testing apparatus. Testing apparatus 800 includes pipe 802. Pipe 802 is a PVC pipe with PVC end caps 804 placed on each end of the pipe. Pipe 802 has an inside diameter of 10.16 cm and is 158.75 cm long end-to-end.

Ports 806 are used for sample addition into pipe 802 and sample collection from the pipe. Ports 806 are 10 mm diameter openings spaced 30 cm apart. Ports 806' are closest to the ends of pipe 802 and are 4.375 cm from the ends of the pipe. Pipe 802 was leveled and filled with 12.0 L of water and allowed to stabilize for 48 hours before testing. The water temperature ranged from 24.5° C. to 26.5° C. Results obtained in preliminary studies demonstrated that the first sampling point, e.g., 30 cm from the addition location, provided the most useful information relative to diffusion kinetics of test fluids. Efficiency of dispersion was evaluated by comparing concentrations for all sampling locations at the termination of each study.

After the stabilization period, an appropriate volume of a test fluid was added to pipe 802. Two test fluids were assessed in apparatus 800. The first test fluid was an end product formed by the addition of copper sulfate pentahydrate to the base product fluid produced by system 50. The first test fluid had an undiluted volume of 202.7 μL and was 5% on a weight basis copper. The second test fluid was a 5% (on a weight basis of copper) prepared with copper sulfate pentahydrate with reverse osmosis water and acidified by adding 20 μL of 93% sulfuric acid per 100 mL of solution. The second test fluid had an undiluted volume of 212.4 μL.

Figure 19:
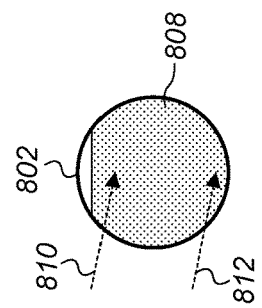
FIG. 19 depicts a cross-section end view of a pipe with water in the pipe.

Samples were then collected after selected incubation times. The incubation times included no external mixing of the water (e.g., pipe 802 is a static water system). Mixing via thermal currents was minimized by maintaining the test apparatus at 25±1° C. in a climate controlled room. Samples were collected via micropipetter from 2.5 cm below the surface of the water. At the end of the test, samples were also collected from about 0.5 cm above the bottom of the water. FIG. 19 depicts a cross-section end view of pipe 802 with water 808 in the pipe showing sample collection locations 810 and 812. Location 810 is for sample collection via micropipetter from 2.5 cm below the surface of water 808. Location 812 is for sample collection from about 0.5 cm above the bottom of water 808 at the end of the study.

Figure 20:
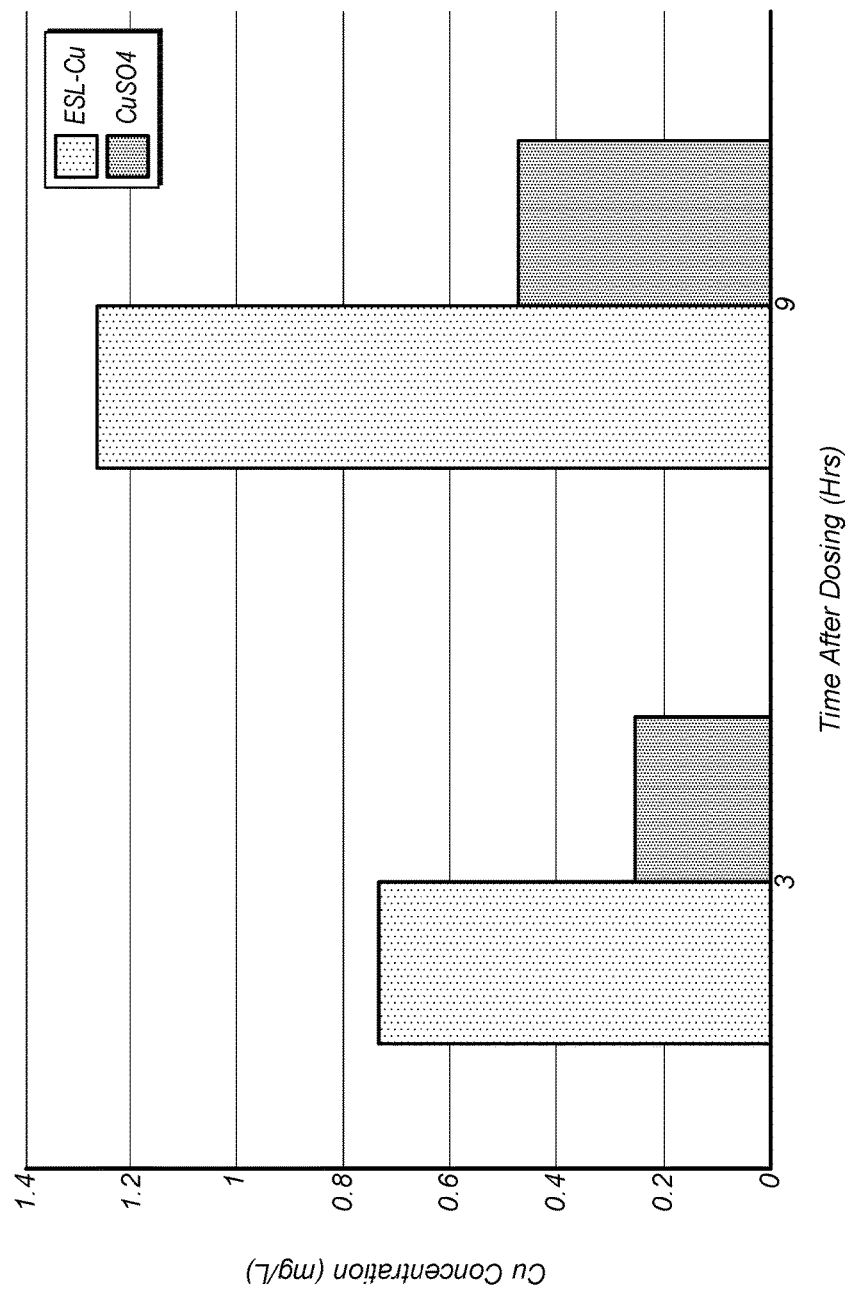
FIG. 20 depicts plots of copper concentration versus time at the 30 cm sampling location for the chelated copper described herein, designated ESL-Cu, and copper sulfate, designated $CuSO_4$.
Figure 21:
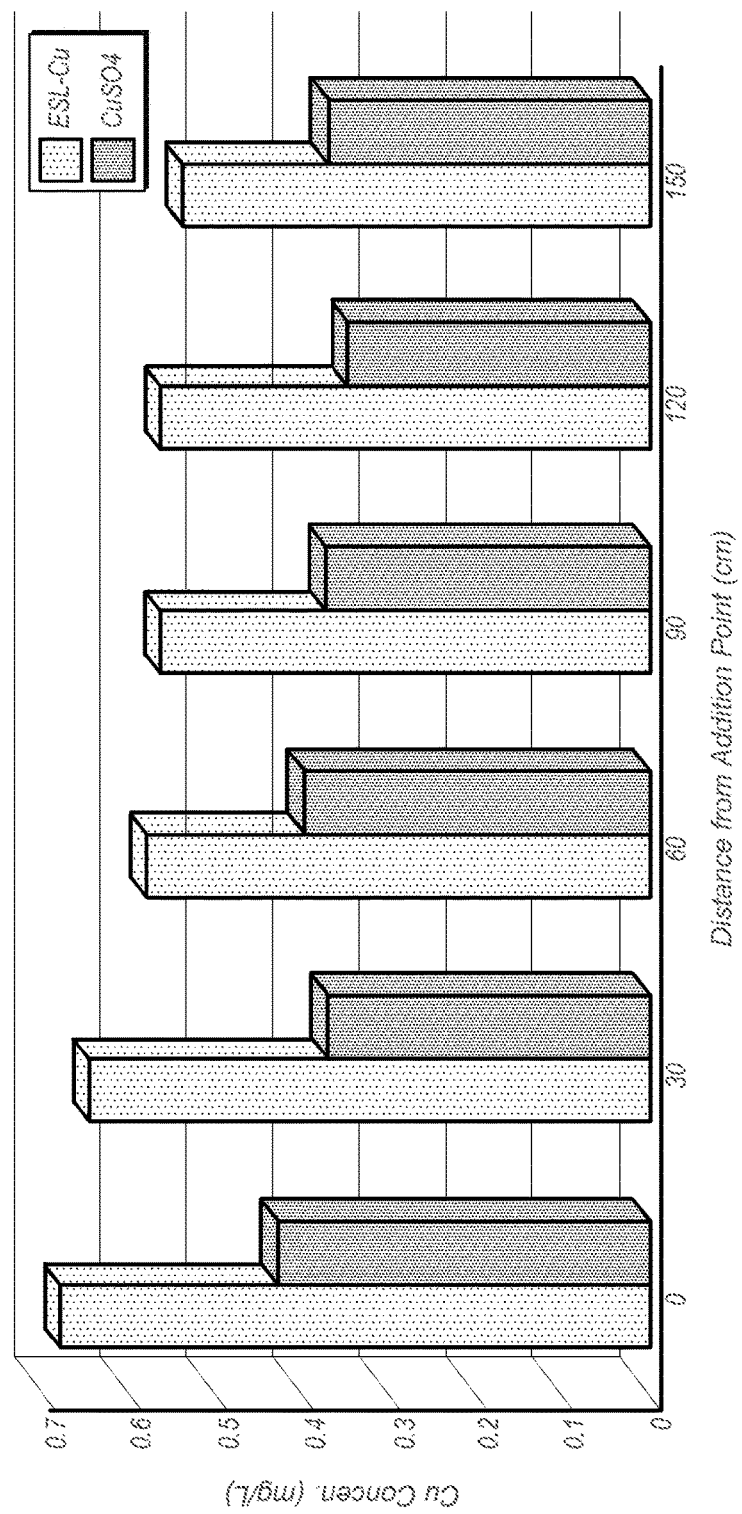
FIG. 21 depicts surface diffusion profiles of ESL-Cu and $CuSO_4$ after a 72-hour hold-time.
Figure 22:
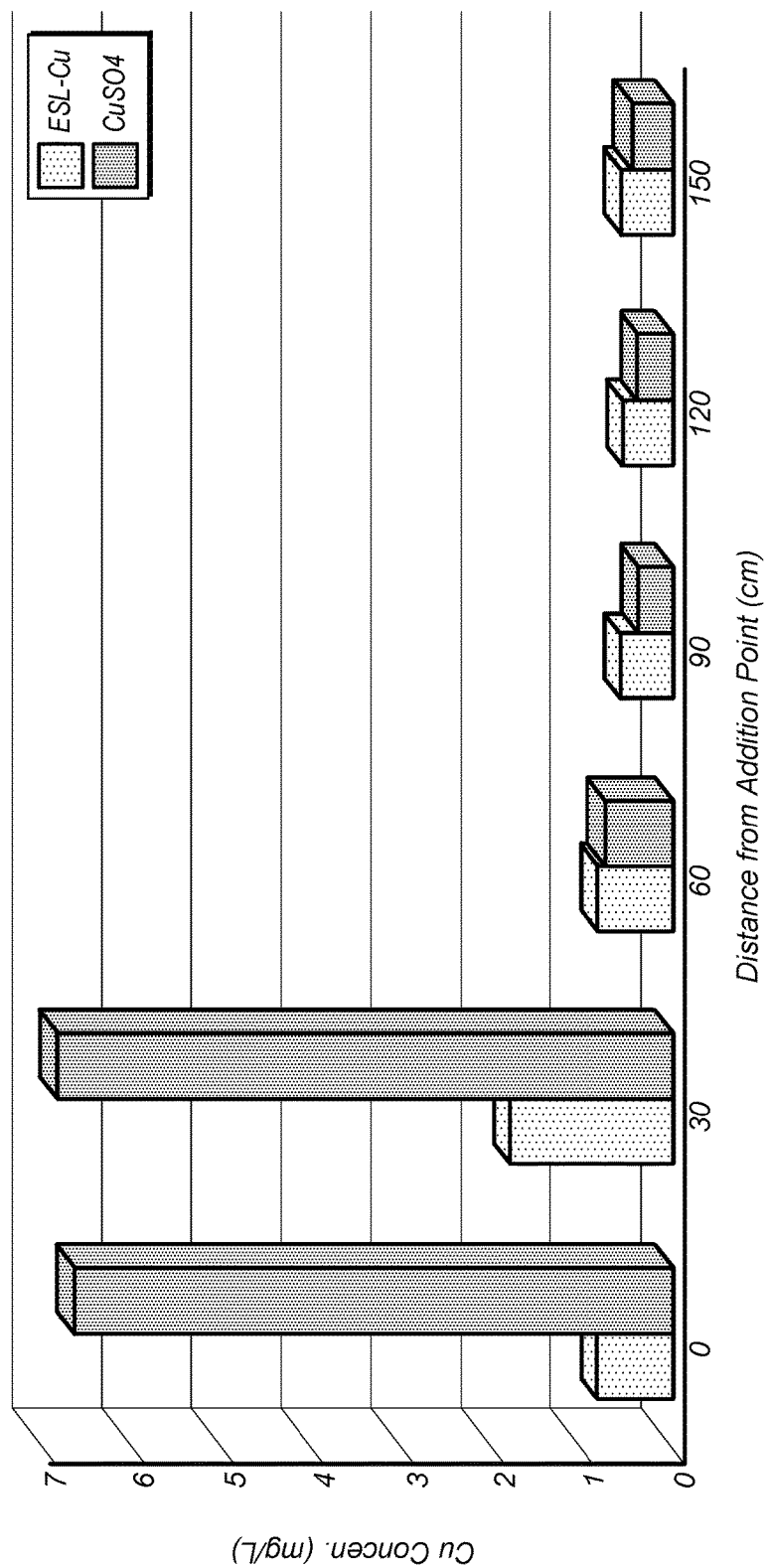
FIG. 22 depicts the bottom concentration diffusion profiles of ESL-Cu and $CuSO_4$ after a 72-hour hold-time.

FIG. 20 depicts plots of copper concentration versus time at the 30 cm sampling location for the chelated copper described herein, designated ESL-Cu, and copper sulfate, designated $CuSO_4$. FIG. 21 depicts surface diffusion profiles of ESL-Cu and $CuSO_4$ after a 72-hour hold-time. time versus distance from addition point for the first test fluid. FIG. 22 depicts the bottom concentration diffusion profiles of ESL-Cu and $CuSO_4$ after a 72-hour hold-time. As shown in FIGS. 20-22, copper in the ESL-Cu treated water disperses more quickly, more uniformly, and at higher concentrations than that in the $CuSO_4$ treated water.

Figure 23:
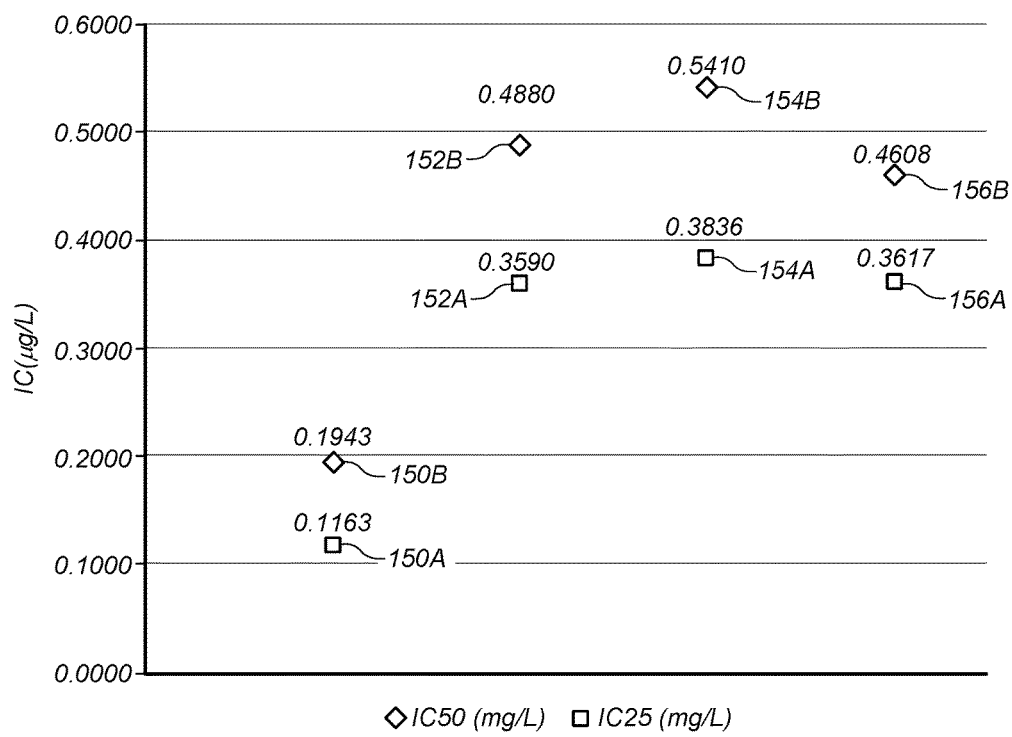
FIG. 23 depicts inhibition concentrations for 25 percent reduction ($IC_{25}$) and 50 percent reduction ($IC_{50}$) in reproduction or growth using the end product formed from the base product fluid and three other product formulations.
Figure 24:
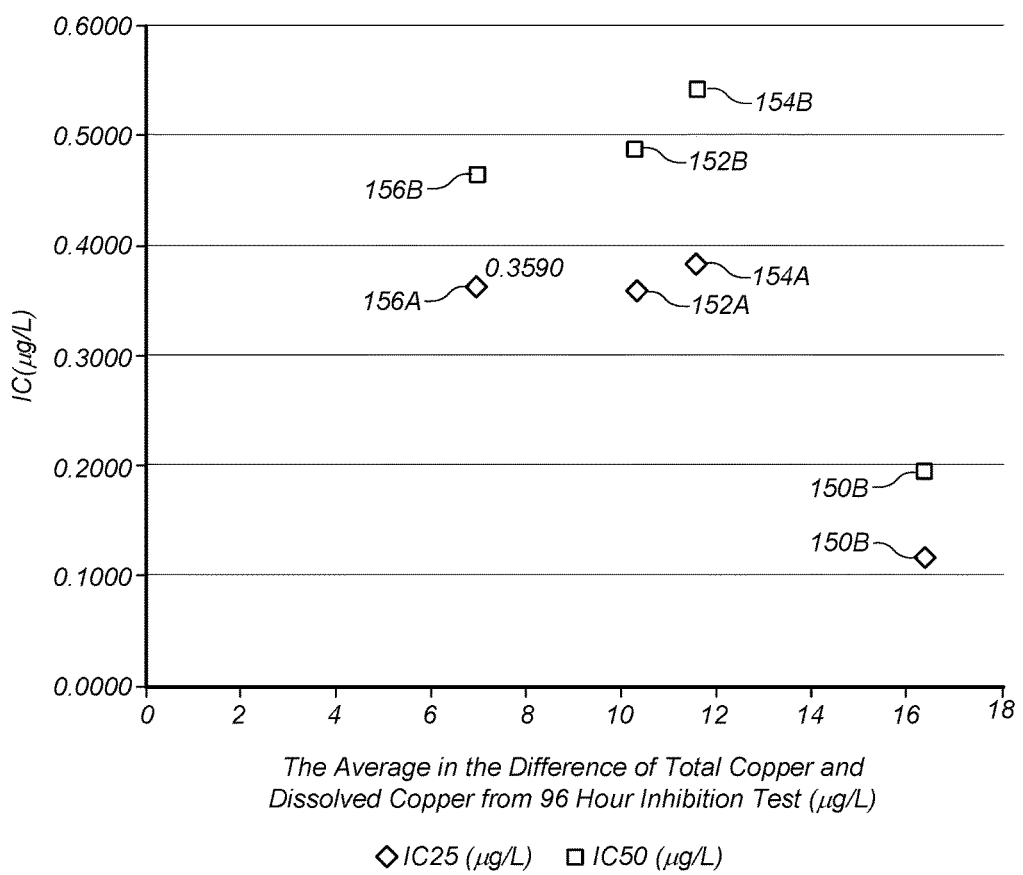
FIG. 24 depicts the average in the difference of total copper and dissolved copper from a 96 hour inhibition test for the different inhibition concentrations and formulations depicted in FIG. 23.

In certain embodiments, the end product formed from the base product fluid may show improved inhibition results in water tests. FIG. 23 depicts inhibition concentrations for 25 percent reduction ($IC_{25}$) and 50 percent reduction ($IC_{50}$) in reproduction or growth using the end product formed from the base product fluid and three other product formulations. Points 150A ($IC_{25}$) and 150B ($IC_{50}$) are for an end product formed from the base product fluid produced by system 50.

Points 152A ($IC_{25}$) and 152B ($IC_{50}$) are for a product formed by adding the 88 gram solution of copper sulfate pentahydrate and water to 12 grams of a synthetic formulation. The synthetic formulation is made by dissolving ammonium sulfate (72.4 grams) into distilled water (275.3 grams) and then adding 98% sulfuric acid (230.4 grams) slowly with cooling to hold the maximum temperature during sulfuric acid addition to 118° F. This synthetic formulation produces a product similar to the "cold process" metal chelating agent.

Points 154A ($IC_{25}$) and 154B ($IC_{50}$) are for a product formed by adding the 88 gram solution of copper sulfate pentahydrate and water to 12 grams of Sorber Acid (described above). Points 156A ($IC_{25}$) and 156B ($IC_{50}$) are for a product formed by adding 20 grams of copper sulfate pentahydrate to 80 grams of distilled water.

As shown in FIG. 23, the end product produced from the base product fluid (points 150A, 150B) show improved inhibition concentrations as compared to other product formulations (e.g., other metal chelating agents). FIG. 24 depicts the average in the difference of total copper and dissolved copper from a 96-hour inhibition test for the different inhibition concentrations and formulations depicted in FIG. 23. As shown in FIG. 24, the end product produced from the base product fluid (points 150A, 150B) shows increased uptake of copper by the target species during the inhibition test.

In certain embodiments, the base product fluid, produced by system 50 and its related process described above in the embodiments of FIGS. 1-12, has a low pH (typically around 0 pH) when in a water solution (e.g., when the base product fluid includes the molecular compounds mixed with water). In certain embodiments, the base product fluid has a pH of at most about 2 when mixed with water. In some embodiments, the base product fluid has a pH of between about 0 and about 2 or between about 0.4 and about 1 when mixed with water. In certain embodiments, a solid base product (or powdered base product) is isolated from the base product fluid (e.g., the base product fluid is dehydrated to form a solid base product). In some embodiments, the solid base product is isolated from the base product fluid when the pH of the base product fluid is between about 0.4 and about 1. The solid base product may be rehydrated (e.g., water added) to reconstitute the base product fluid without affecting the properties of the original base product fluid (e.g., the base product fluid before isolation of the solid base product). With the low pH of the base product fluid when mixed with water, the solid base product and/or the base product fluid may not be acutely toxic to skin and is useable in water-based treatment systems.

The base product fluid has certain desired properties that, when combined with one or more other products, provide desirable properties for various treatments in water-based systems. For example, the base product fluid may be combined with copper sulfate pentahydrate ($CuSO_4.5H_2O$) and water to form an end product. In certain embodiments, the end product is formed by combining the copper sulfate pentahydrate and water in an approximately 0.3:1 ratio and then combining that mixture with the base product fluid in an approximately 7.33:1 ratio. The resulting end product may have a copper concentration of about 57 μg/μL (about 4.8% copper by weight) after the addition of copper sulfate and water to the base product fluid. In some embodiments, the end product is between about 5% and about 15% by weight base product fluid. For example, the end product may be about 12% by weight base product fluid. The end product may be used in water-based treatment systems such as, but not limited to, swimming pools, wastewater lagoons, storage reservoirs, decorative fountains, cooling water, irrigation canals, ornamental lakes, ponds, lagoons, reservoirs, water features on golf courses, retention ponds, detention ponds, natural and artificial lakes, impoundments, estuaries, streams, and rivers, municipal and/or commercial water treatment systems, zebra mussel treatment systems, agricultural water treatment systems (e.g., control of tadpole shrimp), and irrigation lines (e.g., keeping drip irrigation lines open and free from algae and bacteria).

In certain embodiments, the base product fluid is used to produce an end product that controls nuisance mollusks or bivalves such as zebra mussels and quagga mussels, crustaceans, and biofouling invertebrates. The end product may be formed by adding copper sulfate and water to the base product fluid. The end product may be placed at a location of a mollusk infestation or in an area to prevent mollusk infestation. In some embodiments, the end product is applied to open waters such as lakes, ponds, or reservoirs, to flowing waters such as pipelines, or to closed systems such as cooling systems or fire suppression systems. An effectiveness of the end product may depend on ambient water conditions such as, but not limited to, temperature, alkalinity, hardness, and total organic carbon (TOC).

For open water treatment, the end product may be applied directly to the body of water being treated. In some embodiments, the end product is applied at the water surface and allowed to disperse. Because of the high diffusion rate provided by the base product fluid, metal or metal salts may disperse readily in stagnant (static) water systems. In some embodiments, the end product is directed to a specific location (e.g., at or near a pipe input) via hoses, pumps, diffusers, etc.

For flowing water treatment, the end product may be provided continuously into or on the flowing water. The end product may be used as a curative measure when adult or juvenile mollusks already exist (for which a higher initial dose may be needed) or as a preventative measure to inhibit colonization. For closed systems, the end product may be applied directly into a source for water in the system (e.g., a source or supply tank or reservoir).

For the treatment of mussels, the end product may be provided to the water system at a "lethal concentration" (e.g., a concentration that provides about 100% mortality of the mussels in a given time period). Previous tests have shown that treatment of mussels using other copper based treatments was ineffective at copper equivalent levels of 0.5 mg/l (500 ppb). These previous tests are demonstrated in: Ashlie Watters et al. (2012): Effectiveness of EarthTec® for killing invasive quagga mussels (*Dreissena rostriformis bugensis*) and preventing their colonization in the Western United States, *Biofouling: The Journal of Bioadhesion and Biofilm Research*, 29:1, 21-28; and Renata Claudi M. Sc. et al., "Efficacy of Copper Based Algaecides for Control of Quagga and Zebra Mussels", January, 2014, which are both incorporated by reference as if fully set forth herein.

Figure 25:
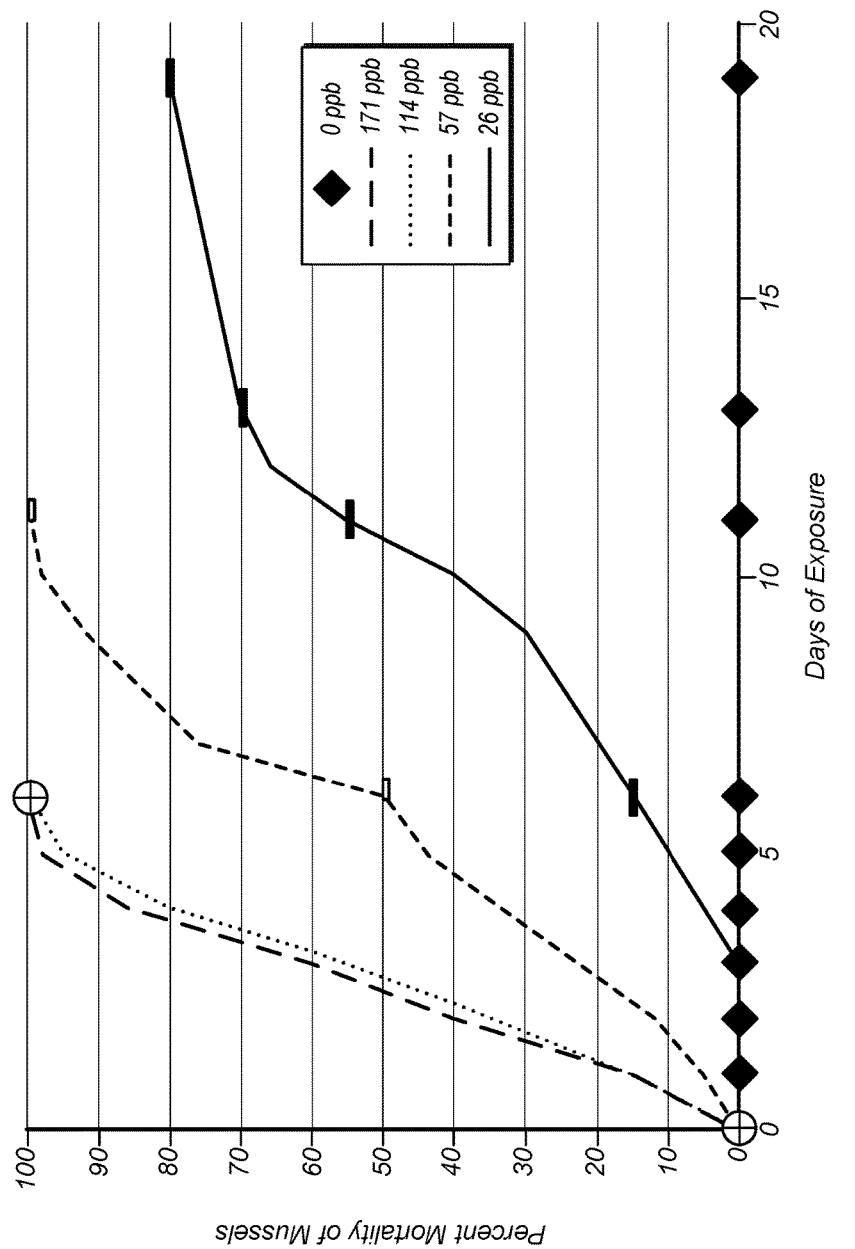
FIG. 25 depicts percent mortality versus days of exposure for different concentrations of the end product (with concentrations expressed as copper equivalent concentrations) made from the base product fluid.

The end product made from the base product fluid produced by system 50, however, shows lethal effectiveness at lower copper equivalent levels. FIG. 25 depicts percent mortality of mussels versus days of exposure for different concentrations of the end product (with concentrations expressed as copper equivalent concentrations) made from the base product fluid produced by system 50. As shown in FIG. 25, the end product shows full mortality in less than 10 days for copper equivalent levels down to 57 ppb (0.057 mg/l). The copper equivalent level of 57 ppb may be achieved using a 1 ppm concentration of the end product.

In some cases, the end product may show mortality at longer times (e.g., 20-30 days) for copper equivalent levels as low as 26 ppb. The data for 26 ppb shown in FIG. 25 was terminated early (at 80% mortality) due to changes in the lake level and a consequent disruption in the pipeline's flow. Nevertheless, it is believed that full mortality may be achieved with 26 ppb copper equivalent level at normal summer temperatures. Treatment for mussels at the copper equivalent levels shown in FIG. 25 (e.g., below about 171 ppb copper equivalent level) may allow the end product to be used as a viable alternative to chlorine or other treatments used for mollusk control.

In some embodiments, the end product for mollusk control is formed from a solid base product. For example, the base product fluid produced by system 50 may be dehydrated to form a solid or powdered base product. In some embodiments, the base product fluid is dehydrated to form the solid or powdered base product when the pH of the base product fluid is between about 0.4 and about 1, as described above. Water may be added to the solid base product to rehydrate and re-liquefy the base product. In some embodiments, the solid base product is formed into a solid shape such as a puck. In some embodiments, the powdered base product is mixed with copper sulfate powder. The powdered base product and copper sulfate mix may be formed into a solid shape or delivered using a metered delivery system to the treatment site. The powdered base product and copper sulfate mix may then activate (rehydrate) when added to the water (e.g., the water being treated for mollusks).

In some embodiments, the base product fluid is used to produce an end product that is used to remove taste and odor compounds and/or microorganisms from drinking water (e.g., municipal drinking water). A common result of algae blooms in water, which may be eventually used for drinking water, is the formation of two compounds: geosmin and methyl iso-borneol (MIB). Geosmin and MIB, at concentrations in the ppt (parts per trillion) range may give water an objectionable earthy taste and/or odor. Current treatment options for taste and odor include high chlorine dosage, which is problematic in that carcinogenic chlorine by-products are formed, and powder activated carbon, which may be expensive.

The treatment of water for taste and/or odor using the end product may not involve a mechanism utilizing the copper in the end product. Removal of taste and/or odor from the water may be due to UV absorbing compounds found in the base product fluid and thus, the end product. In some embodiments, the end product is provided at a dose level of 1 ppm, which results in a copper equivalent level of about 57 ppb. Other dose levels may be used as desired and/or the end product may have a different (e.g., lower) concentration of copper as desired.

In some embodiments, the base product fluid is used to produce an end product for control and/or elimination of microorganisms in water systems. For example, the end product may be used to control and/or eliminate microorganisms in heat exchangers, metalworking fluids, reverse osmosis water processing, oil and gas field injection, fracturing, produced water, oil, and gas from wells and reservoirs, deaeration tower, oil and gas operation and transportation systems, oil and gas separation systems and storage tanks, oil and gas pipelines, gas vessels, toilet bowls, swimming pools, household drains, household surfaces, process equipment, sewage systems, wastewater and treatment systems, other industrial process water, boiler systems, ballast water and equipment, pipes, tubes, and other surfaces in these systems.

Figure 26:
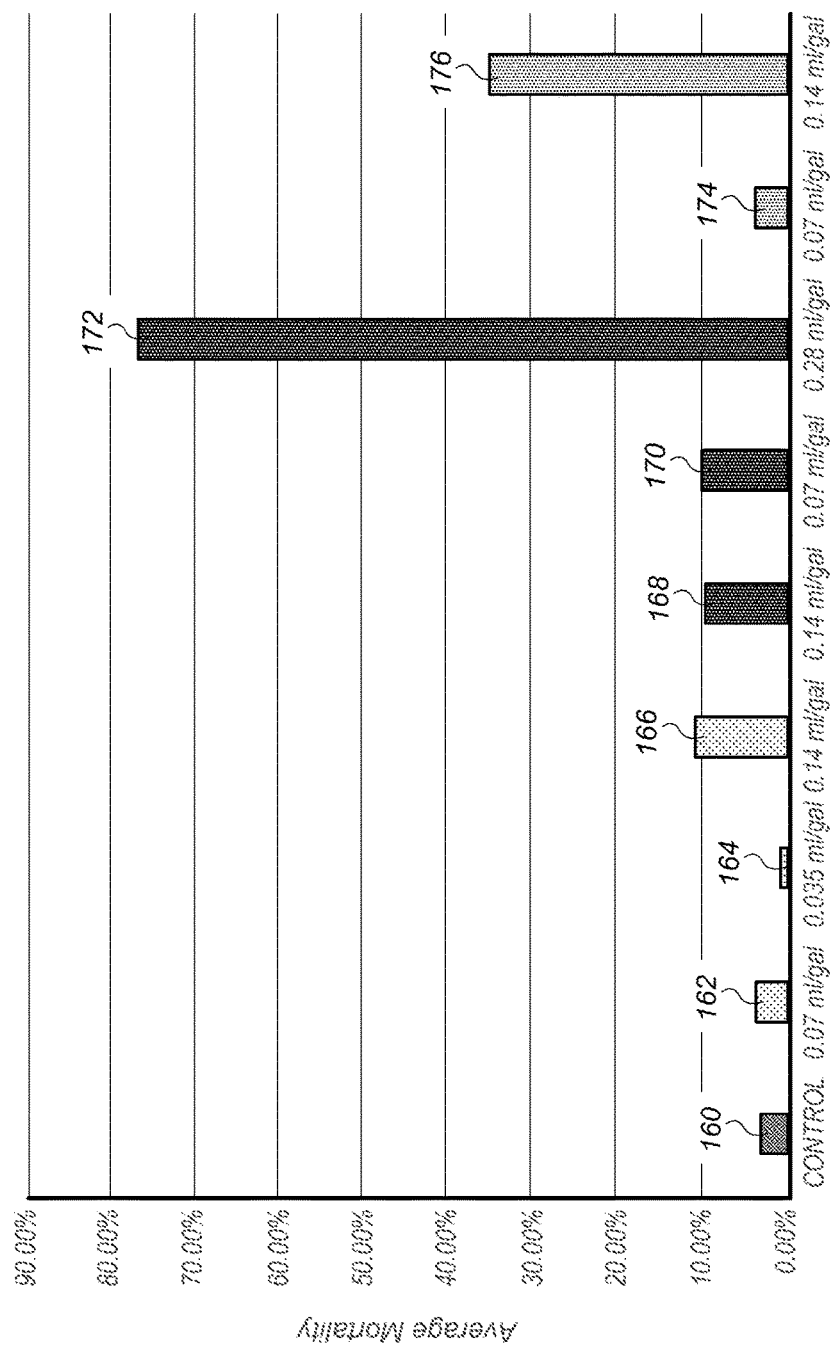
FIG. 26 depicts average mortality of *Aedes albopictus* larvae after 24 hours of exposure to various treatments of the end product.

In some embodiments, the base product fluid is used to produce an end product that is used as a mosquito killer (e.g., "mosquito-cide"). Copper sulfate is known to kill mosquitoes. However, achieving an effective dose of copper (II) ions for killing mosquitoes may require a significant amount of copper sulfate and most of the copper sulfate (about 90%) may end up in a non-reactive solid as sludge on the bottom of the lake or water reservoir. FIG. 26 depicts average mortality of *Aedes albopictus* larvae after 24 hours of exposure to various treatments of the end product. Column 160 is 24 hour mortality rate for a control group (water only) while columns 162-176 are 24 hour mortality rates for doses of end product as listed under the respective column. Columns 160, 162, 164 166, 168, 170 and 172 represents the mortality rate when a surfactant was added. Columns 174 and 176 represent the mortality rate with no surfactant.

As shown in FIG. 26, a dose rate of about 0.28 ml/gal of end product (with copper equivalent of about 4.5 ppm) shows a 24 hour mortality rate of about 80%, shown by column 172. Lower doses (e.g., 0.07 ml/gal (1.2 ppm copper)) may result in 24 hour mortality rates of about 10%, as shown by column 170. The dose rates shown in FIG. 26 may, however, not be suitable for practical use. The data shown in FIG. 26, however, does suggest that mosquito eradication may be time dependent (e.g., total copper uptake dependent) instead of concentration dependent. Thus, in some embodiments, the end product may be provided to a body of water at a relatively low concentration (e.g., at most about 0.25 ppm copper equivalent). The end product may be left in the body of water for an extended period of time to eradicate or disrupt the life cycle of mosquitoes in the body of water.

In some embodiments, the base product fluid is used to produce an end product that is used as swimming pool sanitizer. Chlorine is the most widely used sanitizer for swimming pools. The only EPA recognized sanitizer other than chlorine is a system that uses biguanides and is sold under the trade name BACQUACIL® (www.bacquacil.com). No other copper based products have shown the efficacy to be approved by the EPA for use as a swimming pool sanitizer. In some embodiments, the end product is dosed into a swimming pool at levels to maintain the copper concentration between about 0.25 ppm and about 1.0 ppm. In some embodiments, the end product is formed from a solid (or powdered) base product mixed with a copper sulfate powder. The solid base product and copper sulfate mix may be formed into a solid shape or delivered using a metered delivery system into the swimming pool. The solid base product and copper sulfate mix may activate (rehydrate) when added to the swimming pool water.

In some embodiments, the base product fluid is used to produce an end product that is used as an algaecide. Copper may be used as a primary active ingredient against algae. There are certain species of algae, however, that do not respond well to copper alone. For example, black algae may not be well controlled with a copper based product alone. In some embodiments, the end product includes the addition of different metals other than copper to target specific algae strains and/or provide a broad spectrum product. For example, metals such as, but not limited to, silver or zinc may be added to the end product in addition to copper or in place of the copper.

In some embodiments, the base product fluid is used to produce an end product that is used for micronutrient delivery (e.g., an agriculture treatment solution used to increase the nutritional value of agricultural crops). The base product fluid may have improved chelating properties including holding the metal or metal salts in solution while also providing uptake of the metal or metal salts to plants or crops. Because of these improved properties, the base product fluid may be used in agriculture treatment solution formulations with compositions similar to those found in the market for traditional chelates such as EDTA. For example, one agriculture treatment solution formulation may include an end product that is a 9% zinc solution with the base product fluid. The formulation may be used as a foliarly applied micronutrient and may be applied at a rate of approximately one to two quarts per acre to crops such as corn, soybeans, and rice. Foliar application methods include mixing with pesticides and spraying it aerially, adding to the irrigation water in traditional pivot irrigators, or applying directly as a dilute water solution or mixing with pesticides through truck mounted spray units. In some embodiments, the end product includes a mixture containing zinc, magnesium, manganese, selenium, molybdenum, boron, iron, cobalt, and copper to supply a broad spectrum micronutrient application. The broad spectrum micronutrient application may be applied to agricultural crops such as corn and soybeans, which are typically treated with EDTA. The end product for micronutrient delivery may provide a higher micronutrient uptake than EDTA due to the improved chelating properties of the base product fluid.

An illustrative example of micronutrient delivery is the delivery of zinc (Zn) complexed to the chelant detailed herein to growing plants via foliar application. In this example, the experiment design was a Randomized Complete Design of 4 treatments of 10 replications for each of five parameters: (1) total chlorophyll by measuring fluorescence, (2) total carotenoids by measuring absorbance following organic solvent extraction, (3) electron transport rate by measuring light absorption and fluorometry, (4) membrane leakage by measuring change in electrolyte concentrations, and (5) leaf tissue concentrations of zinc by digesting samples in nitric acid followed by atomic absorption spectrophotometry. Leaf samples were collected at weekly intervals after squaring. Cotton plants (*Gossypium hirsutum* L.) were grown in a climate controlled chamber on a 14/10 hour, 30/20° C. diurnal cycle, respectively. Individual plants were grown in 48, 3 liter pots containing nutrient deficient potting soil. Plants received identical treatment for nutrition and growth management until squaring. At squaring, the first round of measurements were made and treatments sprayed via a $CO_2$ backpack sprayer with plants arranged in rows. Sprays were allowed to dry before returning to the climate controlled chamber to minimize cross contamination of treatments due to foliar contact. Plants were then grown for an additional two to three weeks with nutrients being supplied via zinc-free Hoagland's solution without added Zn for treatments: ESL-Zn (base product fluid solution), Zinc Sulfate, and Low Zinc. The elemental composition of Hoagland's solution is as follows: N 210 mg/L, K 235 mg/L, Ca 200 mg/L, P 31 mg/L, S 64 mg/L, Mg 48 mg/L, B 0.5 mg/L, Fe 1 to 5 mg/L, Mn 0.5 mg/L, Zn 0.05 mg/L, Cu 0.02 mg/L, and Mo 0.01 mg/L. The four treatments and descriptions were (1) "Control" (no foliar spray addition of Zn), (2) "Low Zn" (No foliar spray addition and the Zn concentration of the Hoagland's solution was reduced to 0.025 mg/L, (3) "ZnSO4" (Foliar spray equivalent of 1% solution [e.g., 8 lbs. of 36% $ZnSO_4$ in 100 gallons $H_2O$] at 15 gallons/acre, and (4) "ESL-Zn" (Foliar spray equivalent of 1% solution [e.g., 8 lbs. of 36% $ZnSO_4$ in 100 gallons $H_2O$] at 15 gallons/acre). Results of the four treatments are presented in TABLE 3:

TABLE 3

| Week | Treatment | Chlorophylls (μg pigments/mg dry weight) | Carotenoids (μg carotenoids/mg dry weight) | Electron Transport Rate (μmol electrons $m^{-2} s^{-}$) | Membrane Leakage (%) | Zn (ppm or mg/L) |
|---|---|---|---|---|---|---|
| 1 | Control | 13.76 | 2.181 | 63 | 16.39 | 39.39 |
|   | ESL-Zn | 12.79 | 1.732 | 70 | 35.54 | 29.00 |
|   | Low Zn | 12.17 | 1.673 | 61 | 32.34 | 27.09 |
|   | ZnSO4 | 11.88 | 1.713 | 71 | 34.68 | 27.46 |

TABLE 3-continued

| Week | Treatment | Chlorophylls (µg pigments/mg dry weight) | Carotenoids (µg carotenoids/mg dry weight) | Electron Transport Rate (µmol electrons $m^{-2} s^{-}$) | Membrane Leakage (%) | Zn (ppm or mg/L) |
|---|---|---|---|---|---|---|
| 2 | Control | 13.47 | 2.128 | 70 | 21.15 | 36.56 |
|   | ESL-Zn | 13.71 | 2.335 | 82 | 25.68 | 88.99 |
|   | Low Zn | 10.02 | 1.567 | 53 | 34.79 | 27.73 |
|   | ZnSO4 | 12.67 | 2.322 | 70 | 28.12 | 61.29 |
| 3 | Control | 11.58 | 1.944 | 68 | 19.12 | 28.54 |
|   | ESL-Zn | 12.89 | 1.807 | 84 | 22.01 | 42.72 |
|   | Low Zn | 7.82 | 1.298 | 55 | 36.77 | 21.88 |
|   | ZnSO4 | 10.72 | 1.559 | 68 | 27.06 | 27.52 |

As illustrated in TABLE 3, chlorophylls within leaf tissues treated with zinc supplements increased after application in week one. However, the ESL-Zn product maintained greater tissue concentrations into week two compared to the standard supplement of zinc sulfate. Analysis indicates that leaf tissue treated with a zinc supplement was capable of increasing their total carotenoid concentrations. Likewise, chlorophylls within leaf tissues treated with zinc supplements increased after application in week one. However, the ESL-Zn product maintained greater tissue concentrations into week two compared to the standard supplement of zinc sulfate. The results demonstrate that zinc supplements stimulated carotenoid production. However, two weeks following application, carotenoid concentrations decreased significantly in the zinc supplemental treatments, though the ESL-Zn product maintained a greater concentration compared to zinc sulfate. Higher values of ETR (electron transport rate) indicate a greater relative rate of photosynthesis. Before application in week one, plants were all very similar in their values with plants to be treated with zinc sulfate possessing slightly greater rates. However, following application and into week two, rates of ETR diverged. ESL-Zn treated plants had the highest rates compared to the other treatments. Larger amounts of membrane leakage indicated as a percent difference, indicate lessened capacity for the leaf tissue to maintain membrane structure. Analysis indicates that both zinc sulfate treatment and ESL-Zn treatment supplementations decreased membrane leakage percentages. However, leaves treated with ESL-Zn maintained greater leakage control into week two as compared to the zinc sulfate treatment. Zinc deficiencies in cotton typically occur when leaf tissue concentrations fall below 20 ppm. On the day of application, all treatment values were above the deficient levels. One week after application, both zinc sulfate treatment and ESL-Zn treatment increased tissue zinc levels significantly. By week two following applications, the concentrations of Zn in zinc sulfate treated leaves had decreased but the concentration in ESL-Zn treated leaves was approximately two-fold greater than that in other treatments.

In some embodiments, the base product fluid is used to produce an end product that is used as an adjuvant to move compounds across cell membranes. For example, a herbicide used with agricultural crops may include the base product fluid to increase the efficacy of the herbicide. In some embodiments, the end product is to increase the efficiency for fertilization of plants or crops.

In some embodiments, the base product fluid is used to produce an end product that is used for potable water treatment. In some embodiments, the base product fluid is used to produce an end product that is used to remove bacteria and/or cyanobacteria from water-based systems. In some embodiments, the end product is used to help pretreat algae, organics, bacteria, and/or cyanobacteria in a water source. New EPA rules are mandating that surface water treatment plants reduce their use of chlorine in order to reduce disinfection by products. The end product may provide enhanced anti-microbial properties due to more rapid penetration through cell walls. Thus, in some embodiments, the end product may be used to maintain bacterial control of the water prior to going into the public distribution system by removing *E. coli, cryptosporidium*, and giardia at lower concentrations. The use of the end product may reduce chlorine dose rates and assist in compliance with new EPA rules. Additionally, the end product may improve the economics of treatment compared to current treatments using chlorine.

As shown in TABLES 4 and 5, the end product formed from the base product fluid produced by system 50 shows effective inhibition (e.g., kill) of *E. coli*.

TABLE 4

TEST RESULTS FOR End Product formed from Base Product Fluid

| | Test Organism: *Escherichia coli* Exposure Time | | | |
|---|---|---|---|---|
| DILUTION (VOLUME PLATED) | 10 minutes | 1 hour | 2 hours | 3 hours |
| | Number of Survivors | | | |
| $10^0$ (1.00 mL) | T, T | T, T | T, T | 80, 76 |
| $10^0$ (0.100 mL) | T, T | T, T | 126, 100 | 16, 21 |
| $10^{-1}$ (0.100 mL) | T, T | 82, 106 | 21, 18 | 3, 1 |
| $10^{-2}$ (0.100 mL) | 86, 80 | 13, 18 | 1, 0 | 0, 1 |
| $10^{-3}$ (0.100 mL) | 10, 23 | 2, 1 | 0, 0 | 0, 0 |

T = Too Numerous To Count (>300 colonies)

TABLE 5

CALCULATED DATA FOR End Product formed from Base Product Fluid

| Test Organism | Exposure Time | CFU/mL in Test Population Control ($Log_{10}$) | CFU/mL of Survivors | $Log_{10}$ Survivors | Percent Reduction | $Log_{10}$ Reduction |
|---|---|---|---|---|---|---|
| *Escherichia coli* | 10 minutes | $1.75 \times 10^6$ | $8.3 \times 10^5$ | 5.92 | 52.6% | 0.32 |
| | 1 hour | (6.24) | $9.4 \times 10^4$ | 4.97 | 94.6% | 1.27 |
| | 2 hours | | $1.13 \times 10^4$ | 4.05 | 99.4% | 2.19 |
| | 3 hours | | $7.8 \times 10^2$ | 2.89 | >99.9% | 3.35 |

CFU = Colony Forming Units

In some embodiments, the base product fluid is used to produce an end product that is used as a fungicide. For example, the end product may be used for fungal control on plants in greenhouses, fields, and residential and commercial locations. In some embodiments, the base product fluid is used to produce an end product that is used for treatment of water used in shellfish depuration processes and/or treatment of water used in aquaculture facilities to inhibit odors and to control cyanobacteria (e.g., toxin producers). In some embodiments, the base product fluid is used to produce an end product that is used as an adjuvant to move compounds across cell membranes. In some embodiments, the base product fluid is used to produce an end product that is used in a cold cream product or other facial or beauty products. For example, the end product may be used for topical treatment of skin wounds, ulcers, or other external infections.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a valve" includes a combination of two or more valves and reference to "a fluid" includes mixtures of fluids.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method for producing a base product fluid, comprising:
    flowing water through a process line;
    adding and mixing anhydrous liquid ammonia and a first portion of sulfuric acid to water in a process line to form a mixed fluid;
    cooling the mixed fluid by flowing the mixed fluid through a heat exchanger; and
    adding a second portion of sulfuric acid to the mixed fluid to form the base product fluid, wherein the second portion of sulfuric acid is greater, by weight, than the first portion of sulfuric acid, wherein adding a second portion of sulfuric acid to the mixed fluid forms a chelating compound having the formula of $((NH_4)_2SO_4)_a \cdot (H_2SO_4)_b \cdot (H_2O)_c \cdot (NH_4HSO_4)_x$, and wherein a is between 1 and 5, b is between 1 and 5, c is between 1 and 5, and x is between 1 and 10.

2. The method of claim 1, wherein the chelating compound is capable of chelating a metal salt.

3. The method of claim 1, wherein a ratio of the second portion of sulfuric acid to the first portion of sulfuric acid by weight is between about 2:1 and about 7.1.

4. The method of claim 1, further comprising maintaining the ammonia as a liquid by cooling the ammonia to a temperature below a boiling point of ammonia at a pressure above atmospheric pressure.

5. The method of claim 1, further comprising maintaining a pressure in the process line between about 40 psig and about 80 psig.

6. The method of claim 1, further comprising combining the base product fluid with a metal salt and water to form an end product.

7. The method of claim 1, wherein the chelating compound comprises an elemental composition of:
    between about 3% and about 6% hydrogen;
    between about 10% and about 15% nitrogen;
    between about 25% and about 30% sulfur; and
    between about 52% and about 60% oxygen.

* * * * *

UNITED STATES PATENT AND TRADEMARK OFFICE
CERTIFICATE OF CORRECTION

PATENT NO. : 10,093,563 B2
APPLICATION NO. : 15/184531
DATED : October 9, 2018
INVENTOR(S) : David Nicholas, Reid Henry Bowman and Freddie L. Singleton Page 1 of 1

It is certified that error appears in the above-identified patent and that said Letters Patent is hereby corrected as shown below:

In the Specification

In Column 2, Lines 20-21, replace '$((NH_4)_2SO_4)_a.(H_2SO_4)_b.(H_2)_c.(NH_4HSO_4)_x$' with -- $((NH_4)_2SO_4)_a.(H_2SO_4)_b.(H_2O)_c.(NH_4HSO_4)_x$ --

Signed and Sealed this
Sixth Day of October, 2020

Andrei Iancu
*Director of the United States Patent and Trademark Office*